United States Patent
Tanpairoj et al.

(10) Patent No.: US 12,530,303 B2
(45) Date of Patent: Jan. 20, 2026

(54) MULTI-TIER CACHE FOR A MEMORY SYSTEM

(71) Applicant: Micron Technology, Inc., Boise, ID (US)

(72) Inventors: Kulachet Tanpairoj, San Mateo, CA (US); Nadav Grosz, Broomfield, CO (US); James Fitzpatrick, Laguna Niguel, CA (US); Jianmin Huang, San Carlos, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/546,618

(22) Filed: Dec. 9, 2021

(65) Prior Publication Data

US 2022/0188242 A1 Jun. 16, 2022

Related U.S. Application Data

(60) Provisional application No. 63/124,184, filed on Dec. 11, 2020.

(51) Int. Cl.
*G06F 12/0897* (2016.01)
*G06F 12/02* (2006.01)
*G06F 12/0811* (2016.01)

(52) U.S. Cl.
CPC ...... *G06F 12/0897* (2013.01); *G06F 12/0246* (2013.01); *G06F 12/0811* (2013.01); *G06F 2212/1024* (2013.01)

(58) Field of Classification Search
None
See application file for complete search history.

(56) References Cited

U.S. PATENT DOCUMENTS

| | | | | |
|---|---|---|---|---|
| 2010/0122016 A1* | 5/2010 | Marotta | ................ | G11C 16/16 711/E12.001 |
| 2010/0153631 A1* | 6/2010 | Moon | .................... | G06F 12/08 710/305 |

(Continued)

FOREIGN PATENT DOCUMENTS

WO  2018/222692 A2  12/2018

OTHER PUBLICATIONS

"International Search Report and Written Opinion of the International Searching Authority," issued in connection with Int'l Appl. No. PCT/US21/62826, dated Apr. 5, 2022 (15 pages).

*Primary Examiner* — Stephanie Wu
(74) *Attorney, Agent, or Firm* — Holland & Hart LLP

(57) ABSTRACT

Methods, systems, and devices for a multi-tier cache for a memory system are described. A memory device may include memory cells configured as cache storage and memory cells configured as main storage. The cache storage may be a multi-tier cache and may include sets of different types of memory cells or memory cells operated as different types of memory cells, with different latencies, storage densities, or other performance characteristics. The memory device or a controller or host system for the memory device may determine the set of memory cells within the multi-tier cache to which a set of data is to be written, or may move the set of data within the multi-tier cache or between the multi-tier cache and the main storage, based on one or more of a variety of performance considerations.

20 Claims, 9 Drawing Sheets

(56) References Cited

U.S. PATENT DOCUMENTS

| | | | |
|---|---|---|---|
| 2012/0191900 A1* | 7/2012 | Kunimatsu | G06F 3/0638 |
| | | | 711/E12.008 |
| 2012/0311293 A1* | 12/2012 | Nemazie | G06F 12/0893 |
| | | | 711/171 |
| 2015/0127886 A1* | 5/2015 | Kanno | G06F 12/0246 |
| | | | 711/103 |
| 2018/0081543 A1* | 3/2018 | Muchherla | G06F 3/0604 |
| 2019/0102083 A1* | 4/2019 | Dusija | G06F 3/0679 |
| 2020/0201772 A1 | 6/2020 | Grosz | |
| 2020/0310645 A1 | 10/2020 | Li | |
| 2020/0341684 A1* | 10/2020 | Shveidel | G06F 11/1076 |
| 2021/0117122 A1* | 4/2021 | Byun | G06F 3/0659 |
| 2021/0223994 A1* | 7/2021 | Kanno | G06F 3/0679 |
| 2021/0405900 A1* | 12/2021 | Kurita | G06F 3/0604 |

* cited by examiner

MULTI-TIER CACHE FOR A MEMORY SYSTEM

CROSS REFERENCE

The present application for patent claims the benefit of U.S. Provisional Patent Application No. 63/124,184 by Tanpairoj et al., entitled "MULTI-TIER CACHE FOR A MEMORY SYSTEM" and filed Dec. 11, 2020, which is assigned to the assignee hereof, and which is expressly incorporated by reference herein.

FIELD OF TECHNOLOGY

The following relates generally to one or more systems for memory and more specifically to a multi-tier cache for a memory system.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
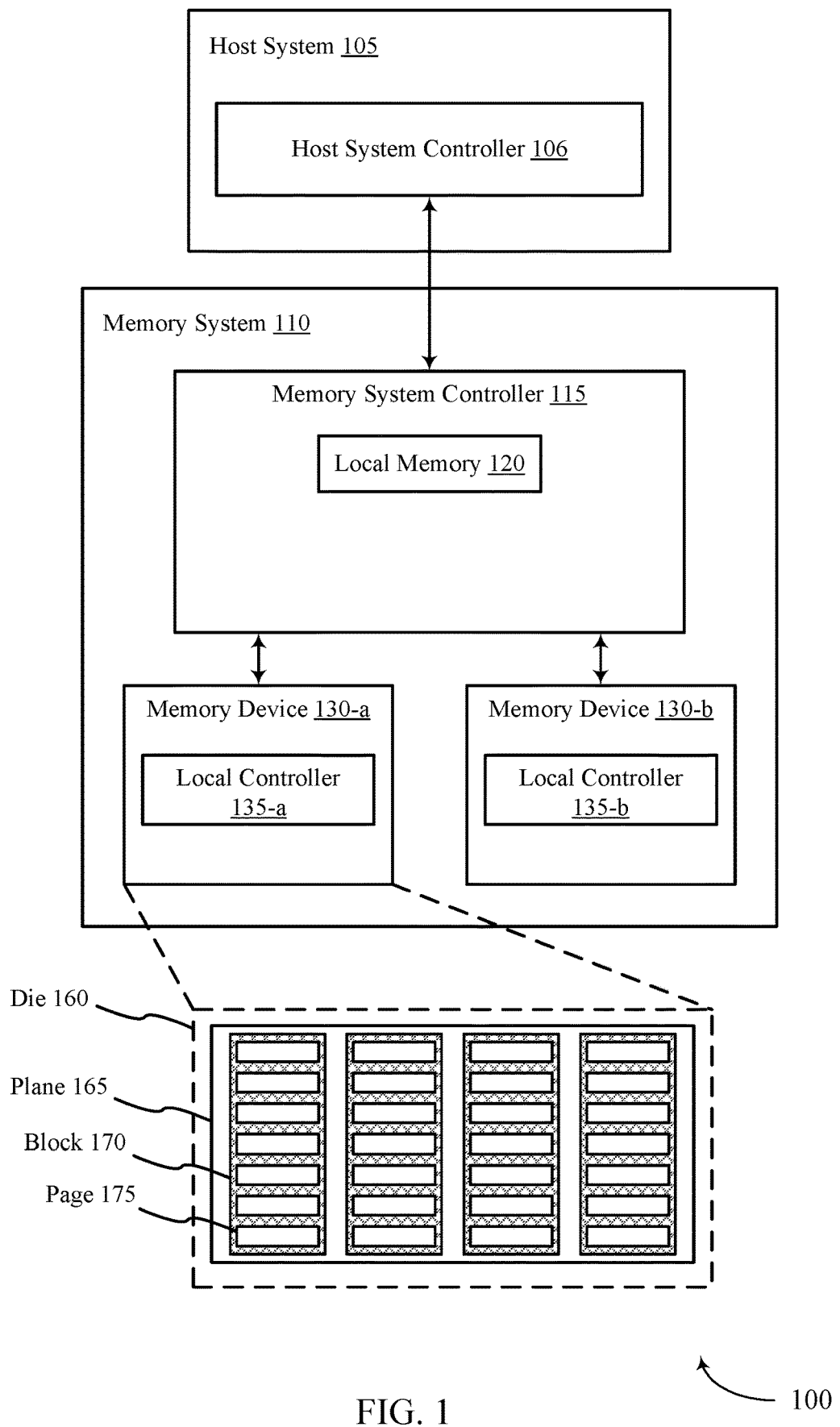
FIG. 1 illustrates an example of a system that supports a multi-tier cache for a memory system in accordance with examples as disclosed herein.

Different types of memory cells may be associated with different latencies, such as read or write latencies, as well as different storage densities (e.g., bits of information stored per memory cell). For example, a type of memory cell that provides a relatively higher storage density may be associated with relatively longer latencies, and vice versa. In view of such tradeoffs, a memory device may use memory cells of a first type with a relatively higher storage density as main storage for data and may use memory cells of a second type associated with relatively lower latencies as a cache for the main storage. In this way, latencies associated with the main storage may be hidden from (e.g., not observable from the perspective of) a host system for the memory device, as data may be written to the lower latency cache and, if then requested while stored in the cache (e.g., before the data is flushed from the cache), also read from the lower latency cache. Using a single type of memory cells for a cache may, however, have various disadvantages. For example, because of a relatively lower storage density, such a cache may occupy an undesirably large portion of physical space within a memory device if sized to accommodate a desirably large quantity of data.

As described herein, a memory device may include a multi-tier cache, in which more than one type of memory cells may be used as a cache for main storage within the memory device, where the main storage may include a third, distinct type of memory cell. For example, the main storage may include a set of not-and (NAND) memory cells operated as a type of cell associated with a relatively high storage density but high latency (e.g., quad-level cells (QLCs) operated so as to store four bits of information per memory cell), while the multi-tier cache may include a first cache of NAND memory cells operated as another type of cell associated with a relatively low storage density but low latency (e.g., single level cells (SLCs) operated so as to store one bit of information per memory cell or multi-level cells (MLCs) operated so as to store two bits of information per memory cell) and a second cache of NAND memory cells operated as yet another type of cell associated with an intermediate storage density and intermediate latency (e.g., MLCs or tri-level cells (TLCs) operated so as to store three bits of information per memory cell).

In general, as described herein, a multi-tier cache may include any quantity of sets of memory cells each corresponding to a different type of memory cell. Further, in some cases, the size of one or more caches (e.g., tiers) within the multi-tier cache or the main storage may be adjustable (e.g., the memory device may include memory cells having a same physical structure but which may be selective operated as different types of memory cells, and the quantity of memory cells operated as memory cells included in a cache within the multi-tier cache or included in the main storage may be adjusted). For example, a size of a cache (e.g., a multi-tier cache or a cache therein) or main storage as described therein may be adjusted based on a quantity of availability of memory cells within the cache, within another cache, within the main storage, or any combination thereof.

In some cases, a memory device may determine which cache of a multi-tier cache to which the memory device writes a set of data based on an indication from a host system (e.g., based on an indication included in or otherwise associated with a write command for the data). Additionally or alternatively, the memory device may determine which cache of a multi-tier cache to which the memory device writes a set of data based on a quantity of availability of memory cells within the cache, within another cache, within the main storage, or any combination thereof. In some cases, for example, the memory device may select a different cache than one indicated by the host system based on such factors. Additionally or alternatively, the memory device may determine which cache of a multi-tier cache to which the memory device writes a set of data based on a desired operating performance (e.g., a desired performance characteristic, such as a desired access latency) associated with data, which may be indicated by an associated indication from the host system, for example.

A multi-tier cache and other aspects of the teachings herein may provide one or more benefits, such as providing a cache of increased logical size (e.g., data capacity) with acceptable latencies as observed by a host system and without an excessively increased physical size. Other benefits may be appreciated by one of ordinary skill in the art. For example, a multi-tier cache as described herein may include an least one tier of non-binary memory cells (e.g., MLCs or TLCs), which may provide lower write amplification and thereby support an increased amount of data possibly being written to the memory device within an endurance or wearout limit, relative to a memory device having a single-tier cache of binary memory cells (e.g., SLCs), for example. As another example, a multi-tier cache may support a memory device offering various performance modes with different latency, capacity, endurance, or other tradeoffs, which may be selectable by a host system or otherwise configurable.

Features of the disclosure are initially described in the context of systems, devices, and circuits as described with reference to FIGS. 1 through 3. Features of the disclosure are described in the context of a system and block diagram as described with reference to FIGS. 4 and 5. These and other features of the disclosure are further illustrated by and described with reference to an apparatus diagram and flowcharts that relate to a multi-tier cache for a memory system as described with reference to FIGS. 6-9.

FIG. 1 is an example of a system 100 that supports a multi-tier cache for a memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

Memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, where memory system 110 includes more than one memory device 130, different memory devices 130 within memory system 110 may include the same or different types of memory cells.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130, and other such operations, which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. And in some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 after being read from or before being written to a memory device 130, and may be available within the local memory 120 for subsequent retrieval for or manipulation (e.g., updating) by the host system 105 (e.g., with reduced latency relative to a memory device 130) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM). Additionally or alternatively, a memory device 130 may include one or more arrays of volatile memory cells. For example, a memory device 130 may include random access memory (RAM) memory cells, such as dynamic RAM (DRAM) memory cells and synchronous DRAM (SDRAM) memory cells.

In some examples, a memory device 130 may include (e.g., on a same die or within a same package) a local controller 135, respectively, which may execute operations on one or more memory cells of the memory device 130. A local controller 135 may operate in conjunction with a memory system controller 115 or may perform one or more functions ascribed herein to the memory system controller 115.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the number of blocks 170 that have been erased may be increased such that more blocks 170 are available to store subsequent data (e.g., data subsequently received from the host system 105).

The system 100 may include any quantity of non-transitory computer readable media that support a multi-tier cache for a memory system. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, when executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some examples, a memory device 130 may include a set of memory cells that are operated as a main (e.g., long-term) storage area within the memory device along with a multi-tier cache as described herein. For example, the memory device 130 may include memory cells operated as a first type (e.g., SLC or MLC) and a first cache, memory cells operated as a second type (e.g., MLC or TLC) as a second cache, and memory cells operated as a third type (e.g., TLC or QLC) as the main storage.

In some examples, the host system 105 may transmit a command to the memory system 110 to write a set of data along with an indication of a target cache for the set of data (e.g., an explicit indication of the target cache or a parameter, such as a characteristic of the data or desired performance criteria for the data, from which the memory device may identify or determine the target cache. In some cases, the host system 105 may select the target cache based on it including an available quantity of memory cells, a characteristic of the data to be written, or a desired performance characteristic of memory system 110. The memory device 130 may write the set of data to the target cache, or to another cache based on an overriding consideration, as described herein. In some cases, a single memory device may include a multi-tier cache and main storage as described herein. Additionally or alternatively, a main storage or a multi-tier cache (or a cache thereof) may span more than one memory device 130. The inclusion of a multi-tier cache as described herein within a memory system 110 may support optimization of a latency or other performance characteristic of the memory system 110 from the perspective of the host system 105 along with capacity of the main storage and one or more components of the multi-tier cache, among other benefits that may be appreciated by one of ordinary skill in the art.

Figure 2:
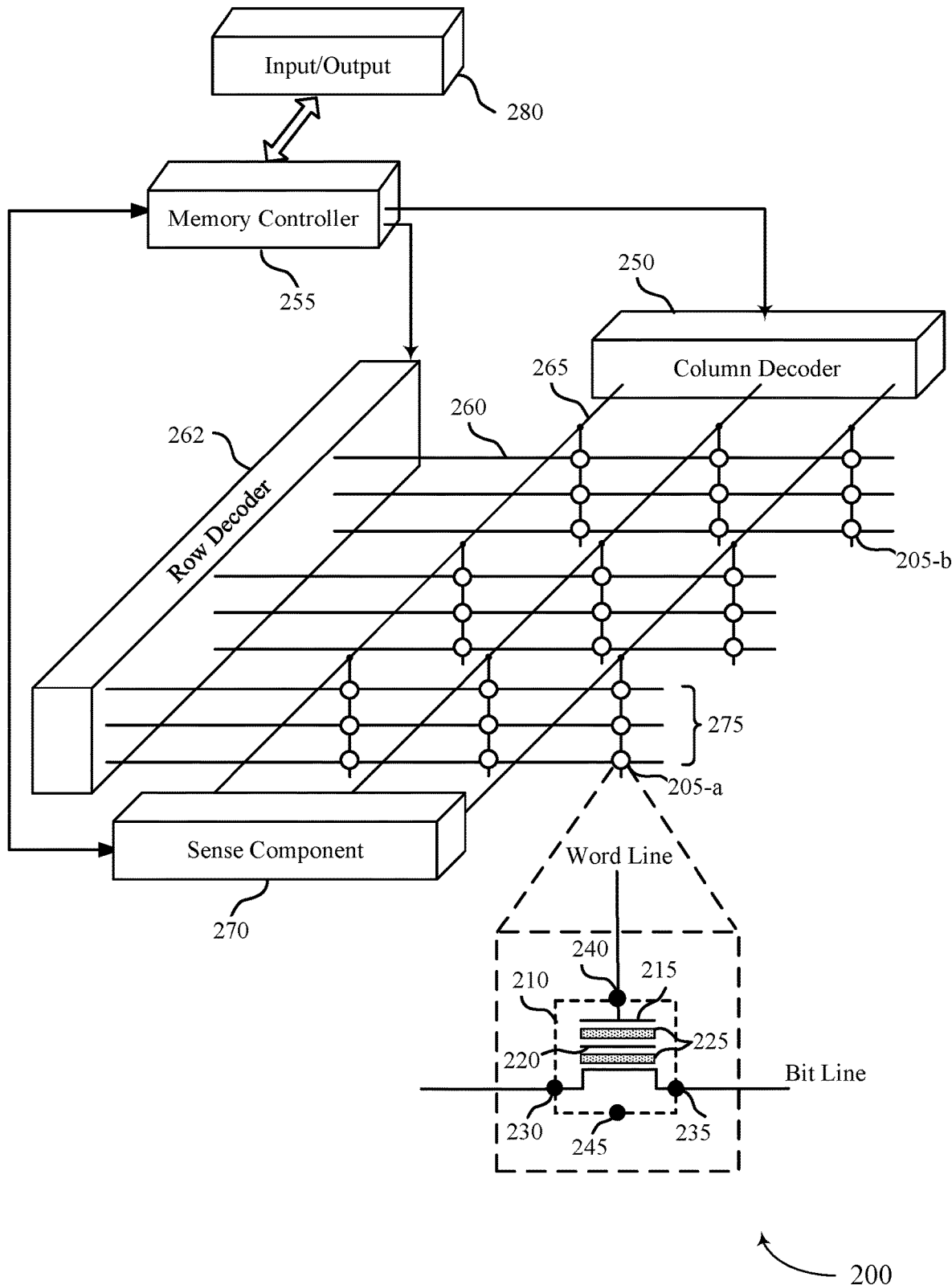
FIG. 2 illustrates an example of a memory device that supports a multi-tier cache for a memory system in accordance with examples as disclosed herein.

FIG. 2 illustrates an example of a memory device 200 that supports a multi-tier cache for a memory system in accordance with examples as disclosed herein. In some cases, the memory device 200 may be an example of a memory device 130 as described with reference to FIG. 1. FIG. 2 is an illustrative representation of various components and features of the memory device 200. As such, it should be appreciated that the components and features of the memory device 200 are shown to illustrate functional interrelationships, and not necessarily actual physical positions within the memory device 200. Further, although some elements included in FIG. 2 are labeled with a numeric indicator, some other corresponding elements are not labeled, even though they are the same or would be understood to be similar, in an effort to increase visibility and clarity of the depicted features.

The memory device 200 may include one or more memory cells, such as memory cell 205-a and memory cell 205-b. A memory cell 205 may be, for example, a flash or other type of NAND memory cell, such as in the blow-up diagram of memory cell 205-a.

Each memory cell 205 may be programmed to store a logic value representing one or more bits of information. In some cases, a single memory cell 205—such as an SLC memory cell 205—may be programmed to one of two supported states and thus may store one bit of information at a time (e.g., a logic 0 or a logic 1). In other cases, a single memory cell 205—such as an MLC, TLC, QLC, or other type of multiple-level memory cell 205—may be programmed to one of more than two supported states and thus may store more than one bit of information at a time. In some examples, a single MLC memory cell 205 may be programmed to one of four supported states and thus may store two bits of information at a time corresponding to one of four logic values (e.g., a logic 00, a logic 01, a logic 10, or a logic 11). In some examples, a single TLC memory cell 205 may be programmed to one of eight supported states and thus may store three bits of information at a time corresponding to one of eight logic values (e.g., 000, 001, 010, 011, 100, 101, 110, or 111). In some examples, a single QLC memory cell 205 may be programmed to one of sixteen supported states and thus may store four bits of information at a time corresponding to one of sixteen logic values (e.g., 0000, 0001, . . . 1111).

In some cases, a multiple-level memory cell 205 (e.g., an MLC memory cell, a TLC memory cell, a QLC memory cell) may be physically different than an SLC cell or other type of multiple-level memory cell 205. For example, memory cells 205 of different storage densities may use a different cell geometry or may be fabricated using different materials. In other cases, memory cells 205 that are physically the same or similar may be selectively (e.g., dynamically) configurable to operate as an SLC cell, or as an MLC cell, or as a TLC cell, or as a QLC cell, etc.

Different types of memory cells 205 may store information in different ways. In a DRAM memory array, for example, each memory cell 205 may include a capacitor that includes a dielectric material (e.g., an insulator) to store a charge representative of a programmable state and thus the stored information. In an FeRAM memory array, as another example, each memory cell 205 may include a capacitor that includes a ferroelectric material to store a charge or a polarization representative of a programmable state and thus the stored information.

In some NAND memory arrays (e.g., flash arrays), each memory cell 205 may include a transistor that has a floating gate or a dielectric material for storing an amount of charge representative of the logic value. For example, the blow-up in FIG. 2 illustrates a NAND memory cell 205-a that includes a transistor 210 (e.g., a metal-oxide-semiconductor (MOS) transistor) that may be used to store a logic value. The transistor 210 has a control gate 215 and may also include a floating gate 220, where the floating gate 220 is sandwiched between two portions of dielectric material 225. Transistor 210 includes a first node 230 (e.g., a source or drain) and a second node 235 (e.g., a drain or source). A logic value may be stored in transistor 210 by placing (e.g., writing, storing) a quantity of electrons (e.g., an amount of charge) on floating gate 220. The amount of charge to be stored on the floating gate 220 may depend on the logic value to be stored. The charge stored on floating gate 220 may affect the threshold voltage of transistor 210, thereby affecting the amount of current that flows through transistor 210 when transistor 210 is activated (e.g., when a voltage is applied to the control gate 215).

A logic value stored in transistor 210 may be sensed (e.g., as part of a read operation) by applying a voltage to the control gate 215 (e.g., to control node 240, via the word line 260) to activate transistor 210 and measuring (e.g., detecting, sensing) the resulting amount of current that flows through the first node 230 or the second node 235 (e.g., via a digit line 265). For example, a sense component 270 may determine whether an SLC memory cell 205 stores a logic 0 or a logic 1 in a binary manner (e.g., based on a presence or absence of a current through the memory cell 205 when a read voltage is applied to the control gate 215, or based on whether the current is above or below a threshold current). For a multiple-level memory cell 205, a sense component 270 may determine a logic value stored in the memory cell 205 based on various intermediate threshold levels of current when a read voltage is applied to the control gate 215. In one example of a multiple-level architecture, a sense component 270 may determine the logic value of a TLC memory cell 205 based on eight different levels of current, or ranges of current, that define the eight potential logic values that could be stored by the TLC memory cell 205.

An SLC memory cell 205 may be written by applying one of two voltages (e.g., a voltage above a threshold or a voltage below a threshold) to memory cell 205 to store, or not store, an electric charge on the floating gate 220 and thereby cause the memory cell 205 store one of two possible logic values. For example, when a first voltage is applied to the control node 240 (e.g., via the word line 260) relative to a bulk node 245 for the transistor 210 (e.g., when the control node 240 is at a higher voltage than the bulk), electrons may tunnel into the floating gate 220. In some cases, the bulk node 245 may alternatively be referred to as a body node. Injection of electrons into the floating gate 220 may be referred to as programing the memory cell 205 and may occur as part of a program operation. A programmed memory cell may, in some cases, be considered as storing a logic 0. When a second voltage is applied to the control node 240 (e.g., via the word line 260) relative to the bulk node 245 for the transistor 210 (e.g., when the control node 240 is at a lower voltage than the bulk node 245), electrons may leave the floating gate 220. Removal of electrons from the floating gate 220 may be referred to as erasing the memory cell 205 and may occur as part of an erase operation. An erased memory cell may, in some cases, be considered as storing a logic 1. In some cases, memory cells 205 may be programmed at a page 175 level of granularity due to memory cells 205 of a page 175 sharing a common word line 260, and memory cells 205 may be erased at a block 170 level of granularity due to memory cells 205 of a block sharing commonly biased bulk nodes 245.

In contrast to writing an SLC memory cell 205, writing a multiple-level (e.g., MLC, TLC, or QLC) memory cell 205 may involve applying different voltages to the memory cell 205 (e.g., to the control node 240 or bulk node 245 thereof) at a finer level of granularity to more finely control the amount of charge stored on the floating gate 220, thereby enabling a larger set of logic values to be represented. Thus, multiple-level memory cells 205 may provide greater density of storage relative to SLC memory cells 205 but may, in some cases, involve narrower read or write margins or greater complexities for supporting circuitry.

A charge-trapping NAND memory cell 205 may operate similarly to a floating-gate NAND memory cell 205 but, instead of or in addition to storing a charge on a floating gate 220, a charge-trapping NAND memory cell 205 may store a charge representing a logic state in a dielectric material below the control gate 215. Thus, a charge-trapping NAND memory cell 205 may or may not include a floating gate 220.

In some examples, each row of memory cells 205 may be connected to a corresponding word line 260, and each column of memory cells 205 may be connected to a corresponding digit line 265. Thus, one memory cell 205 may be located at the intersection of a word line 260 and a digit line 265. This intersection may be referred to as an address of a memory cell 205. Digit lines 265 may alternatively be referred to as bit lines. In some cases, word lines 260 and digit lines 265 may be substantially perpendicular to one another and may create an array of memory cells 205. In some cases, word lines 260 and digit lines 265 may be generically referred to as access lines or select lines.

In some cases, memory device 200 may include a three-dimensional (3D) memory array, where multiple two-dimensional (2D) memory arrays may be formed on top of one another. This may increase the quantity of memory cells 205 that may be placed or fabricated on a single die or substrate as compared with 2D arrays, which, in turn, may reduce production costs, or increase the performance of the memory array, or both. In the example of FIG. 2, memory device 200 includes multiple levels (e.g., decks) of memory cell 205. The levels may, in some examples, be separated by an electrically insulating material. Each level may be aligned or positioned so that memory cells 205 may be aligned (e.g., exactly aligned, overlapping, or approximately aligned) with one another across each level, forming a memory cell stack 275. In some cases, a memory cell stack 275 may be referred to as a string of memory cells 205 (e.g., as described with reference to FIG. 3).

Accessing memory cells 205 may be controlled through row decoder 262 and column decoder 250. For example, row decoder 262 may receive a row address from memory controller 255 and activate an appropriate word line 260 based on the received row address. Similarly, column decoder 250 may receive a column address from memory controller 255 and activate an appropriate digit line 265. Thus, by activating one word line 260 and one digit line 265, one memory cell 205 may be accessed.

Upon accessing, a memory cell 205 may be read, or sensed, by sense component 270. For example, sense component 270 may be configured to determine the stored logic value of memory cell 205 based on a signal generated by accessing memory cell 205. The signal may include a current, a voltage, or both a current and a voltage on the digit line 265 for the memory cell 205 and may depend on the logic value stored by the memory cell 205. The sense component 270 may include various transistors or amplifiers configured to detect and amplify a signal (e.g., a current or voltage) on a digit line 265. The logic value of memory cell 205 as detected by the sense component 270 may be output via input/output component 280. In some cases, sense component 270 may be a part of column decoder 250 or row decoder 262, or sense component 270 may otherwise be connected to or in electronic communication with column decoder 250 or row decoder 262.

A memory cell 205 may be programmed or written by activating the relevant word line 260 and digit line 265 to enable a logic value (e.g., representing one or more bits of information) to be stored in the memory cell 205. A column decoder 250 or a row decoder 262 may accept data, for example from input/output component 280, to be written to the memory cells 205. As previously discussed, in the case of NAND memory, such as flash memory used in some NAND and 3D NAND memory devices, a memory cell 205 may be written by storing electrons in a floating gate or an insulating layer.

A memory controller 255 may control the operation (e.g., read, write, re-write, refresh) of memory cells 205 through the various components, for example, row decoder 262, column decoder 250, and sense component 270. In some cases, one or more of row decoder 262, column decoder 250, and sense component 270 may be co-located with memory controller 255. A memory controller 255 may generate row and column address signals in order to activate the desired word line 260 and digit line 265. In some examples, a memory controller 255 may generate and control various voltages or currents used during the operation of memory device 200.

In some cases, a multiple-level memory cell 205 (e.g., an MLC memory cell, a TLC memory cell, a QLC memory cell) may be physically different than an SLC cell. For example, a multiple-level memory cell 205 may use a different cell geometry or may be fabricated using different materials. In some cases, a multiple-level memory cell 205 may be physically the same or similar to an SLC cell, and other circuitry in a memory block (e.g., a controller, sense amplifiers, drivers) may be configured to operate (e.g., read and program) the memory cell as an SLC cell, or as an MLC cell, or as a TLC cell, etc.

In contrast to writing an SLC memory cell 205, writing a multiple-level (e.g., MLC, TLC, or QLC) memory cell 205 may involve applying different voltages to the memory cell 205 (e.g., to the control node 240 or bulk node 245 thereof) at a finer level of granularity to more finely control the amount of charge stored on the floating gate 220, thereby enabling a larger set of logic values to be represented. Thus, multiple-level memory cells 205 may provide greater density of storage relative to SLC memory cells 205 but may, in some cases, involve narrower read or write margins or greater complexities for supporting circuitry.

In some examples, a memory device 200 may include a set of memory cells 205 that are operated as a main (e.g., long-term) storage area within the memory device along with two or more sets of memory cells 205 that are operated as a multi-tier cache as described herein. For example, the memory device 200 may include memory cells 205 operated as a first type (e.g., SLC or MLC) as a first cache, memory cells 205 operated as a second type (e.g., MLC or TLC) as a second cache, and memory cells 205 operated as a third type (e.g., TLC or QLC) as the main storage.

In some cases, a single memory device 200 may include a multi-tier cache and main storage as described herein. Additionally or alternatively, a main storage or a multi-tier cache (or a cache thereof) may span more than one memory device 200. The inclusion of a multi-tier cache as described herein within one or more memory devices 200 may support optimization of a latency or other performance characteristic of the one or more memory devices 200 from the perspective of the host system along with capacity of the main storage and one or more components of the multi-tier cache, among other benefits that may be appreciated by one of ordinary skill in the art.

Figure 3:
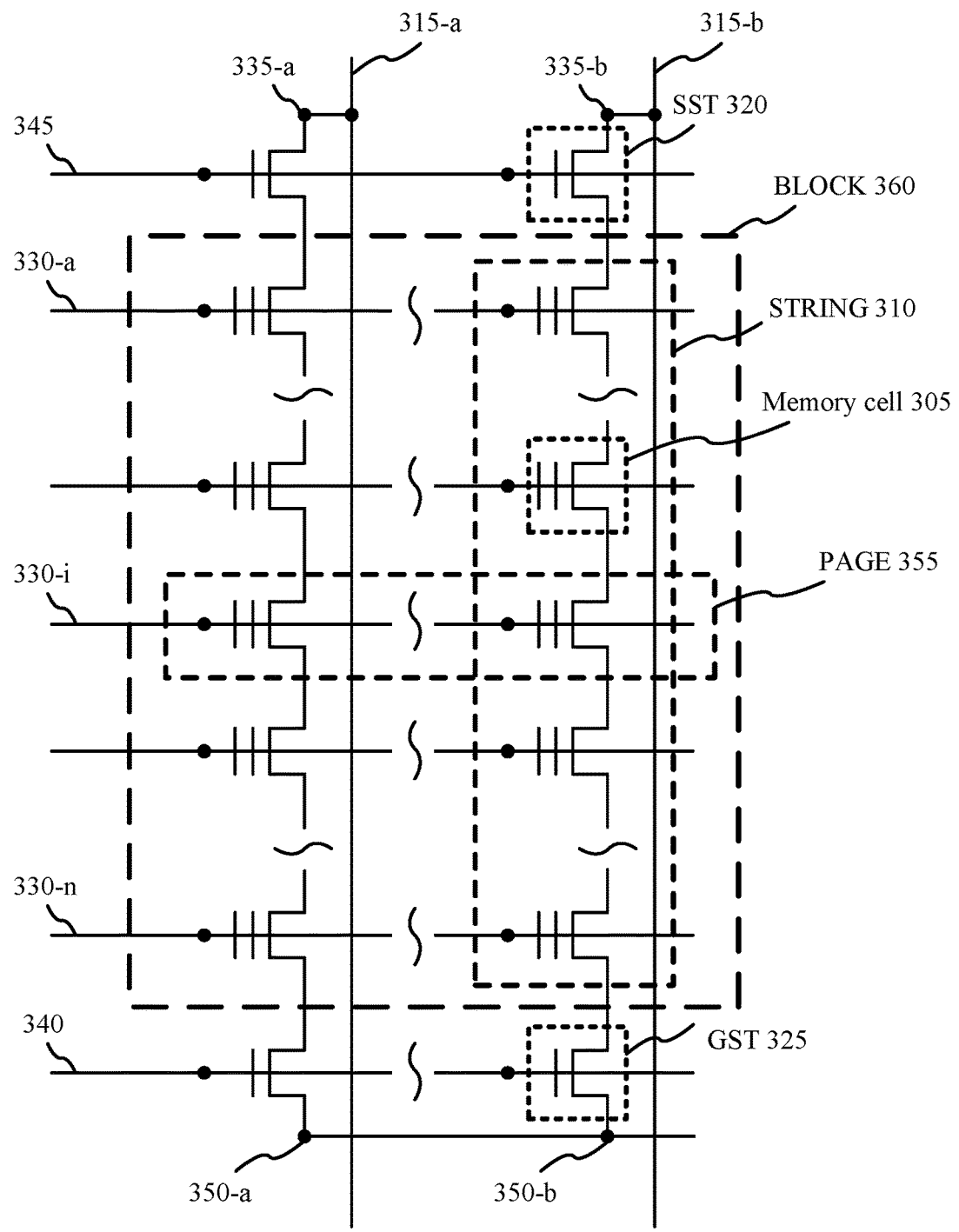
FIG. 3 is an example of a memory circuit that supports a multi-tier cache for a memory system in accordance with examples as disclosed herein.

FIG. 3 illustrates an example of a memory circuit 300 that supports a multi-tier cache for a memory system in accordance with examples as disclosed herein. The memory circuit 300 may be an example of a portion of a memory device, such as a memory device 130 or a memory device 200. Although some elements included in FIG. 3 are labeled with reference numbers, some other corresponding elements are not labeled, though they are the same or would be understood to be similar, in an effort to increase visibility and clarity of the depicted features.

The memory circuit 300 includes multiple memory cells 305 (e.g., flash memory cells 205 as described with reference to FIG. 2) connected in a NAND configuration. In a NAND memory configuration, multiple flash memory cells 305 may connected in series to form strings 310 of memory cells 305, in which a drain of each flash memory cell 305 in the string 310 may be coupled with a source of another flash memory cell 305 in the string.

A string 310 may be a set of memory cells 305 that are each associated with (e.g., coupled with) a corresponding digit line 315. Each memory cell 305 in a string 310 may be associated with a separate word line 330 (e.g., one of word lines 330-a, 330-i, 330-n), such that the quantity of word lines 330 may be equal to the quantity of memory cells 305 in a string 310. A string 310 as shown in FIG. 3 may be an example of aspects of a memory cell stack 275 as described with reference to FIG. 2, for example.

A page 355 may be a set of memory cells 305 that are each associated with (e.g., coupled with) a corresponding word line 330. Thus a string 310 may include memory cells 305 from multiple different pages 355, and a page 355 may include memory cells 305 from multiple different strings 310. A page 355 as shown in FIG. 3 may be an example of aspects of a page 175 as described with reference to FIG. 1, for example.

A block 360 may be a set of multiple pages 355 and thus may also include multiple strings 310. A block 360 as shown in FIG. 3 may be an example of aspects of a block 170 as described with reference to FIG. 1, for example.

In some cases, NAND memory cells 305 may be programmed (e.g., set to a logic 0 value) and read from at the page 355 level of granularity, but may not be erasable (e.g., reset to a logic 1 value) at the page level of granularity. For example, NAND memory may instead be erasable at a higher level of granularity, such as at the block 360 level of granularity. In some cases, a NAND memory cell 305 may be erased before it may be re-programmed. Different memory devices may have different read, write, or erase characteristics.

In some cases, each string 310 of memory cells 305 in the memory circuit 300 may be coupled with a respective string select transistor (SST) 320 at one end of the string 310 and a respective ground select transistor (GST) 325 at the other end of the string 310. The gate of each SST 320 may be coupled with a string select line 345, which may be common to all SST 320 for the block 360. The gate of each GST 325 may be coupled with a ground select line 340, which may be common to all GSTs 325 for the block 360. The source of each GST 325 for the block 360 may be coupled with a common source line 350. And the drain of each SST 320 may be coupled with a respective digit line 315, the respective digit line 315 specific to an individual string 310.

An SST 320 may be used to selectively couple a corresponding string 310 of memory cells 305 to a digit line 315, based on applying a voltage to the string select line 345, and thus to the gate of SST 320. Similarly, a GST 325 may be used to selectively couple the corresponding string 310 of memory cells 305 to the source line 350, based on applying a voltage to ground select line 340, and thus to the gate of GST 325.

To operate the memory circuit 300 (e.g., to perform a program operation, a read operation, or an erase operation on one or more memory cells 305 of the block 360), various voltages may be applied to the string select line 345 (e.g., to the gate of the SSTs 320), to one or more digit lines 315 (e.g., to the drain 335 of one or more SSTs 320), to one or more word lines 330, to the ground select line 340 (e.g., to the gate of the GSTs 325), to the source line 350 (e.g., to the source of the GSTs 325), or to a bulk for the memory cells 305 (not shown) of the block 360. In some cases, each memory cell 305 of a block 360 may have a common bulk, the voltage of which may be controlled independently of bulks for other blocks 360.

In some cases, as part of a read operation for a memory cell 305, a positive voltage may be applied to the corresponding digit line 315 while source line 350 may be grounded or otherwise biased at a voltage lower than the voltage applied to the digit line 315. Concurrently, voltages may be applied to the string select line 345 and the ground select line 340 that are above the threshold voltages of the SST 320 and the GST 325 for the memory cell 305 respectively, thereby turning the SST 320 and GST 325 "ON" such that a channel associated with the string 310 that includes the memory cell 305 may be electrically connected to the corresponding digit line 315 and the source line 350. A channel may be an electrical path through the memory cells 305 in the string 310 (e.g., through the sources and drains of the transistors in the memory cells 305 of the string 310) that may conduct current under some operating conditions.

Concurrently, multiple word lines 330 (e.g., in some cases all word lines 330) of the block 360—except a selected word line 330 coupled with the memory cell 305 to be read)—may be set to a voltage (e.g., VREAD) that is higher than the threshold voltage (VT) of the memory cells 305. VREAD may cause all memory cells 305 in the unselected pages 355 (e.g., rows) to turn "ON" so that each unselected memory cell 305 in the string 310 may maintain high conductivity within the channel. In some examples, the word line 330 associated with the memory cell 305 to be read may be set to a voltage, VTarget. Where the memory cells 305 are operated as SLC memory cells, VTarget may be a voltage that is between (i) VT of a memory cell 305 in an erased state and (ii) VT of a memory cell 305 in a programmed state.

When the memory cell 305 to be read exhibits an erased VT (e.g., VTarget>VT of the memory cell 305), the memory cell 305 may turn "ON" in response to the application of VTarget to the selected word line 330, which may allow a current to flow in the channel of the string 310, and thus from the digit line 315 to the source line 350. When the memory cell 305 to be read exhibits a programmed VT (e.g., VTarget<VT of the selected memory cell), the memory cell 305 may remain "OFF" despite the application of VTarget to the selected word line 330, and thus may prevent a current from flowing in the channel of the string 310, and thus from the digit line 315 to the source line 350.

A signal on the digit line 315 for the memory cell 305 (e.g., an amount of current below or above a threshold) may be sensed (e.g., by a sense component 270 as described with reference to FIG. 2), and may indicate whether the memory cell 305 became conductive or remained non-conductive in response to the application of VTarget to the selected word line 330. The sensed signal thus may be indicative of whether the memory cell 305 was in an erased state (e.g., storing a logic 1) or a programmed state (e.g., storing a logic 0). In some cases, a single read operation may read one page 355 of memory cells 305, as the memory cells 305 of the page 355 may all share a common word line 330, based on respective signals associated with the respective digit lines 315 for the memory cells 305 of the selected page 355.

Though aspects of the example read operation above have been explained in the context of an SLC memory cell 305 for clarity, one of ordinary skill in the art will appreciate how techniques may be extended or altered and applied to the context of a multiple-level memory cell 305 (e.g., through the use of multiple values of VTarget corresponding to the different amounts of charge that may be stored in one multiple-level memory cell 305).

In some cases, as part of a program operation for a memory cell 305, charge may be added to a portion of the memory cell 305 such that current flow through the memory cell 305, and thus the corresponding string 310, may be inhibited when the memory cell 305 is later read. For example, charge may be injected into a floating gate 220 as shown in memory cell 205-a of FIG. 2. In some cases, respective voltages may be applied to the word line 330 and the bulk of the memory cell 305 to be programmed such that the control gate 215 of the memory cell 305 is at a higher voltage than the bulk of the memory cell 305 (e.g., a positive voltage may be applied to the word line 330). Concurrently, voltages may be applied to the string select line 345 and the ground select line 340 that are above the threshold voltages of the SST 320 and the GST 325 for the memory cell 305 respectively, thereby turning the SST 320 and GST 325 "ON," and the digit line 315 for the memory cell 305 to be programmed may be set to a relatively high voltage. This may cause an electric field such that electrons are pulled from the source of the memory cell 305 towards the drain. The electric field may also cause some of these electrons to be pulled through the dielectric material 225 and thereby injected into the floating gate 220 of the memory cell 205, through a process which may in some cases be referred to as tunnel injection. In some cases, programming the memory cell 305 may correspond to writing a logic 0 to the memory cell 305.

In some cases, a single program operation may program some or all memory cells 305 in a page 355, as the memory cells 305 of the page 355 may all share a common word line 330 and a common bulk. For a memory cell 305 of the page 355 for which it is not desired to write a logic 0 (e.g., not desired to program the memory cell 305), the corresponding digit line 315 may be set to a relatively low voltage (e.g., ground), which may inhibit the injection of electrons into the floating gate 220.

Though aspects of the example program operation above have been explained in the context of an SLC memory cell 305 for clarity, one of ordinary skill in the art will appreciate how techniques may be extended and applied to the context of a multiple-level memory cell 305 (e.g., through the use of multiple programing voltages applied to the word line 330, or multiple passes or pulses of a programing voltage applied to the word line 330, corresponding to the different amounts of charge that may be stored in one multiple-level memory cell 305).

In some cases, as part of an erase operation for a memory cell 305, charge may be removed from a portion of the memory cell 305 such that current flow through the memory cell 305, and thus the corresponding string 310, may be uninhibited (e.g., allowed, at least to a greater extent) when the memory cell 305 is later read. For example, charge may be removed from a floating gate 220 as shown in memory cell 205-a of FIG. 2. In some cases, respective voltages may be applied to the word line 330 and the bulk of the memory cell 305 to be erased such that the control gate 215 of the memory cell 305 is at a lower voltage than the bulk of the memory cell 305 (e.g., a positive voltage may be applied to the bulk), which may cause an electric field that pulls electrons out of the floating gate 220 and into the bulk of the memory cell 305. In some cases, a single program operation may erase all memory cells 305 in a block 360, as the memory cells 305 of the block 360 may all share a common bulk.

In some cases, electron injection and removal processes associated with program and erase operations may cause stress on a memory cell 305 (e.g., on the dielectric material 225). Over time, such stress may in some cases cause one or more aspects of the memory cell 305 (e.g., the dielectric material 225) to deteriorate. For example, floating gate 220 may become unable to maintain a stored charge. Such deterioration may be an example of a wearout mechanism for a memory cell 305, and for this or other reasons, some memory cells 305 may support a finite quantity of program and erase cycles.

Where the memory cells 305 are operated as SLC memory cells, VTarget may be a voltage that is between (i) VT of a memory cell 305 in an erased state and (ii) VT of a memory cell 305 in a programmed state. In contrast to writing an SLC memory cell 205, writing a multiple-level (e.g., MLC, TLC, or QLC) memory cell 205 may involve applying different voltages to the memory cell 205 (e.g., to the control node 240 or bulk node 245 thereof) at a finer level of granularity to more finely control the amount of charge stored on the floating gate 220, thereby enabling a larger set of logic values to be represented.

In some examples, a memory circuit 300 may include a set of memory cells 305 that are operated as a main (e.g., long-term) storage area within the memory device or asset of memory cells 305 that are operated as part of (e.g., as a cache within) a multi-tier cache as described herein. In some cases, a single memory circuit 300 may include a multi-tier cache or a multi-tier cache and a main storage as described herein. Additionally or alternatively, a main storage or a multi-tier cache (or a cache thereof) may span more than one memory circuit 300. The inclusion of a multi-tier cache as described herein within one or more memory circuits 300 may support optimization of a latency or other performance characteristic of the one or more memory circuits 300 from the perspective of the host system along with capacity of the main storage and one or more components of the multi-tier cache, among other benefits that may be appreciated by one of ordinary skill in the art.

Figure 4:
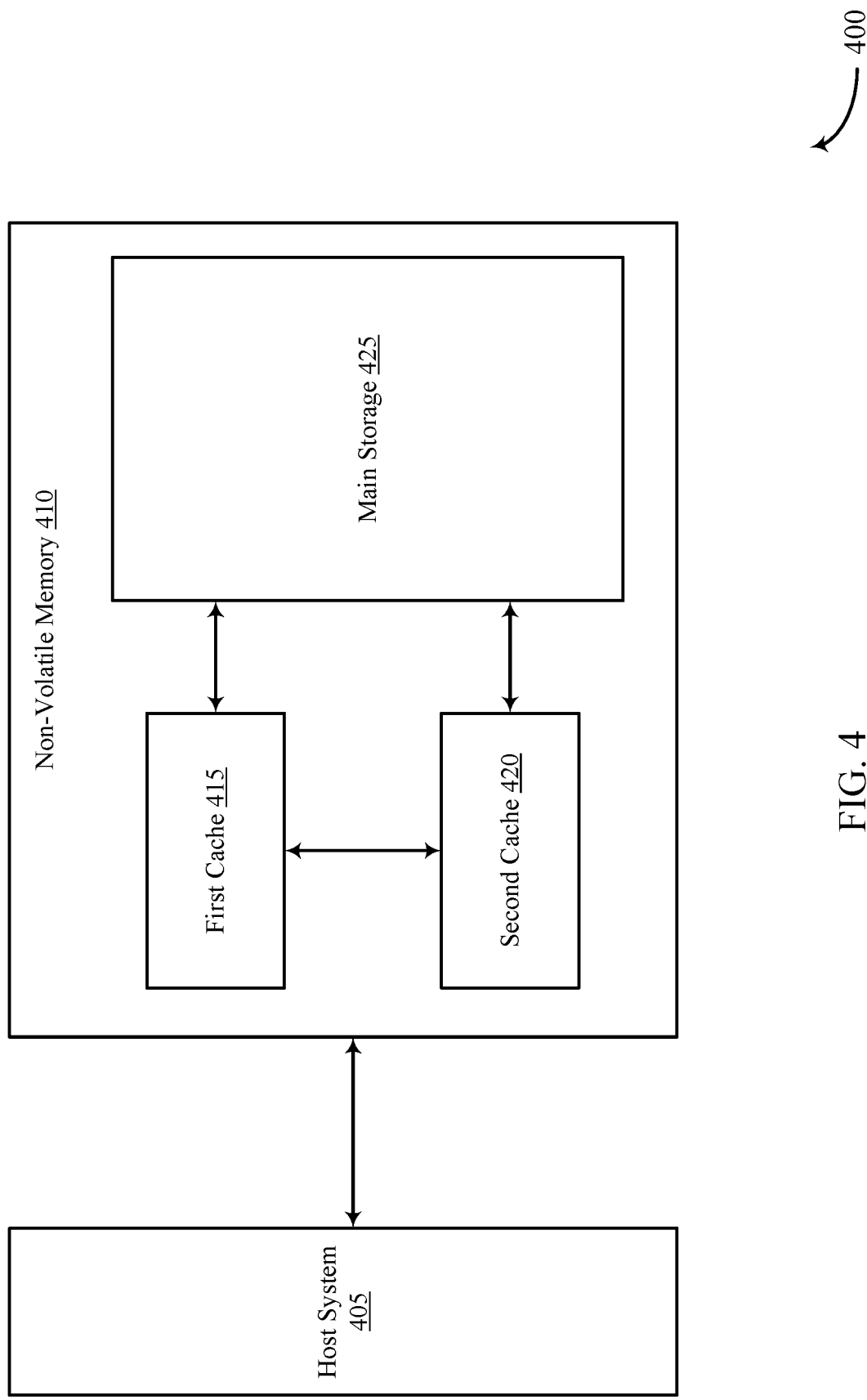
FIG. 4 illustrates an example of a system that supports a multi-tier cache for a memory system in accordance with examples as disclosed herein.

FIG. 4 illustrates an example of a system 400 that supports a multi-tier cache for a memory system in accordance with examples as disclosed herein. The system 400 may include a host system 405 and a non-volatile memory 410. The non-volatile memory 410 may include a first cache 415 (e.g., one or more memory cells configured or otherwise operated as a first cache 415), a second cache 420 (e.g., one or more memory cells configured or otherwise operated as a second cache 420), and a main storage 425 (e.g., one or more memory cells configured or otherwise operated as main storage 425 of the non-volatile memory 410). In some examples, the non-volatile memory 410 may include a local controller, while in other examples a memory system controller may perform one or more of the operations described herein.

The first cache 415, the second cache 420, and the main storage 425 may include one or more memory cells (e.g., NAND memory cells) that are configured to store one or more bits of data. For example, the first cache 415, the second cache 420, and the main storage 425 may include SLCs configured to store one bit of data, MLCs configured to store two bits of data, TLCs configured to store three bits of data, or QLCs configured to store four bits of data. Each of the first cache 415, the second cache 420, and the main storage 425 may include memory cells configured as a respective type of memory cells. For example, the memory cells of the first cache 415, the second cache 420, and the main storage 425 may be operated according to the configuration shown below in Table 1, although other configurations are possible.

TABLE 1

| First Cache 415 | Second Cache 420 | Main Storage 425 |
|---|---|---|
| SLC | MLC | QLC |
| SLC | TLC | QLC |
| MLC | TLC | QLC |

By operating the memory cells of the first cache 415, the second cache 420, and the main storage 425 as different types of memory cells, the storage capacity and the overall processing speed of the non-volatile memory may be optimized.

In some examples, whether the memory cells of the first cache 415, the second cache 420, and the main storage 425 may be respectively operated as a SLC, MLC, TLC, or QLC may be a matter of design choice. For example, memory cells operated as SLCs may be associated with faster operating speeds than MLCs, TLCs, and QLCs, but may occupy a larger physical space of the non-volatile memory 410 or may reduce the total storage capacity of the non-volatile memory 410. Conversely, memory cells operated as QLCs may be associated with slower operating speeds than SLCs, MLCs, and TLCs, but may occupy a smaller physical space of the non-volatile memory 410 or may increase the total storage capacity of the non-volatile memory 410. Accordingly, the memory cells of the first cache 415, the second cache 420, and the main storage 425 may be operated as SLCs, MLCs, TLCs, or QLCs based on the desired performance characteristics of the non-volatile memory 410. Although FIG. 4 illustrates two portions of the non-volatile memory 410 being operated as caches (e.g., the first cache 415 and the second cache 420), the non-volatile memory 410 may include any quantity of caches that each include a respective set of memory cells being operated as SLCs, MLCs, TLCs, or QLCs.

In some examples, the non-volatile memory 410 may include a plurality of memory cells (e.g., a memory array) that are configured to be operated as cache memory or as the main storage 425. The memory array may include, for example, NAND memory cells that may be operated (e.g., selectively) as SLCs, MLCs, TLCs, or QLCs. Accordingly, the first cache 415, the second cache 420, and the main storage 425 may correspond to portions of the memory array that include memory cells being operated as a same type of memory cell as included in the cache or main storage 425. For example, the memory array may include a subset of memory cells operated as SLCs and thus may correspond to the first cache 415. Similarly, the memory array may include a subset of memory cells operated as MLCs that correspond to the second cache 420, and a subset of memory cells operated as QLCs that correspond to the main storage 425. Though shown as separate blocks in the illustration of FIG. 4, one of ordinary skill in the art will appreciate that the memory cells included in the first cache 415, the second cache 420, and the main storage 425 may be physically distributed in any manner (e.g., need not necessarily correspond to separate physically contiguous groupings of memory cells).

The size of the first cache 415, the second cache 420, and the main storage 425 may be statically configured or may be configurable (e.g., dynamic) such that the quantity of memory cells associated with each may increase or decrease. For example, the size of the first cache 415 may increase relative to the size of the second cache 420 and the main storage 425 based on a quantity of available cells in the first cache 415 (or the second cache 420). In this example, the size of the first cache 415 may increase by operating a memory cell included in the second cache 420 or the main storage 425 as a type of memory cell included in the first cache 415. In other examples, the non-volatile memory 410 may include a second plurality of memory cells (e.g., a second memory array; a pool of memory cells) that are dedicated for cache storage. Accordingly, the size of the first cache 415 or the second cache 420 may be increased by operating memory cells included in the second memory array as a type of memory cell included in the respective cache. In either example, the size of the first cache 415, the second cache 420, and the main storage 425 may be adjusted (e.g., dynamically adjusted) to account for current operating conditions or desired performance characteristics of the non-volatile memory 410.

As described herein, data may be written to (e.g., temporarily written to) a target cache of the non-volatile memory. A target cache may refer to the cache indicated in a command (e.g., a write command) for data to be written to. For example, the host system 405 may select a target cache based on an availability of a cache (e.g., whether the first cache 415 includes a quantity of available memory cells), a characteristic of the data to be written, or a desired performance characteristic of the non-volatile memory 410.

In some examples, the host system 405 may select the first cache 415 or the second cache 420 as the target cache based on a likelihood of the data being overwritten within a duration, a likelihood of a read command for the data being issued within a duration, or a size of the data. For example, the host system 405 determine a type of data or a program or process (e.g., application) associated with data to be written to the first cache 415 or the second cache 420. If, for example, the type of data (or the program or process associated with the data) is such that the data is likely to be overwritten within the duration, the host may select the first cache 415 as the target cache for the data, as it may be desirable to store the data to a cache having memory cells associated with a relatively fast operating speed (e.g., SLCs). Similarly, if the type of data (or the program or process associated with the data) is such that the data is likely to be read within the duration, the host may select the first cache 415 as the target cache for the data, as a cache having memory cells associated with a relatively fast operating speed (e.g., SLCs) may similarly be desirable for storing the data.

In other examples, if the type of data (or the program or process associated with the data) is such that the data is relatively less likely to be overwritten within the duration, the host may select the second cache 420 as the target cache for the data, as it may be less desirable to store the data to memory cells associated with a relatively fast operating speed (e.g., SLCs). Similarly, if the type of data (or the program or process associated with the data) is such that the data is less likely to be read within the duration, the host may select the second cache 420 as the target cache for the data, as it may be less desirable to store the data to a cache having memory cells associated with a relatively fast operating speed (e.g., SLCs). Thus, for example, the first cache 415 associated with a relatively faster operating speed may be reserved for data that is more likely to be overwritten or read relatively more quickly or often.

Additionally or alternatively, the host system 405 may select the first cache 415 or the second cache 420 as the target cache based on a desired performance characteristic of the non-volatile memory 410. In some examples, it may be desirable to write data to the first cache 415 or the second cache 420 at a relatively fast speed. Accordingly, the host system 405 may select the first cache 415 or the second cache 420 as the target cache based on a type of memory cell included in one of the caches. For example, the host system 405 may select the first cache 415 as the target cache based on the first cache 415 including SLCs (e.g., memory cells associated with a relatively fast operating speed).

In other examples, the host system 405 may select the first cache 415 or the second cache 420 as the target cache based on a quantity of available memory cells in one of the caches. As data is written to the first cache 415 or the second cache 420, the quantity of available memory cells in the respective cache may decrease. Accordingly, it may be desirable for the host system 405 to select the first cache 415 or the second cache 420 as the target based on whether the respective cache includes enough available memory cells to write data to. In some examples, the non-volatile memory 410 (e.g., a local controller or a memory system controller) may determine a quantity of available memory cells included in the first cache 415, the second cache 420, or both. The non-volatile memory 410 may communicate the quantity of available memory cells to the host system 405, such that the host system 405 may select the first cache 415 or the second cache 420 as the target cache. In some examples, signaling from the non-volatile memory 410 to the host system 405 indicating the quantity of available memory cells may be transmitted based on a request from the host system 405 (e.g., based on a request transmitted from the host system 405 to the non-volatile memory 410).

The non-volatile memory 410 may include a local controller or a memory system controller configured to write data to the target cache. For example, the non-volatile memory 410 may receive a command (e.g., a write command) from the host system 405 that indicates the first cache 415 or the second cache 420 as the target cache. Accordingly, the non-volatile memory 410 may write the associated data to the target cache.

In some examples, however, the non-volatile memory 410 may write the associated data to a cache different than the target cache. For example, the target cache may not include enough available memory cells to write the data to. As one such example, the non-volatile memory 410 may receive a write command indicating the first cache 415 as the target cache. Upon receiving a write command, the non-volatile memory 410 may determine that the first cache 415 does not include a requisite quantity of memory cells for writing the data to. The non-volatile memory 410 may determine that the target cache does not include a requisite quantity of memory cells by comparing the quantity of available memory cells to a threshold value. The threshold value may be a static value (e.g., set based on desired performance characteristics) or may be a dynamic value that is set (e.g., temporarily set) based on a length of the write command received from the host system 405.

A controller (e.g., the local controller or memory system controller) of the non-volatile memory 410 may determine a quantity of available memory cells of the target cache. For example, the controller may determine whether the quantity of available memory cells of the target cache meets or exceeds the threshold value and may write the data to the target cache if the quantity of available cells meets or exceeds the threshold. In other examples, the controller may determine whether the quantity of available memory cells of the target cache meets or exceeds the threshold value and may write the data to another cache if the quantity of available memory cells fails to meet the threshold value. For example, the first cache 415 may not include a requisite quantity of memory cells, thus the non-volatile memory 410 may write the data to the second cache 420.

In some examples, the non-volatile memory 410 may move data from one cache to another (or from one cache to the main storage 425, or from the main storage 425 to a cache). For example, the quantity of available memory cells of the target cache (e.g., the first cache 415) may fail to meet a threshold value and the non-volatile memory 410 may write the data to another cache (e.g., to the second cache 420). After a duration, the quantity of available memory cells of the first cache 415 may exceed the threshold value and the non-volatile memory 410 may write the data from the second cache 420 to the first cache 415.

The quantity of available memory cells of the first cache 415 may exceed the threshold value due to the non-volatile memory 410 moving data from the first cache 415 (e.g., to the second cache 420 or the main storage 425) or erasing the data. The non-volatile memory 410 may move or erase the data based on a characteristic of the data (e.g., based on the data being invalid, based on the data not being read or overwritten within a duration, etc.) or based on a characteristic of data to be written to the cache (e.g., based on data to be written to the cache being a higher priority for the non-volatile memory 410 than the data being moved or erased).

Additionally or alternatively, the non-volatile memory 410 may move (e.g., temporarily move) data from the main storage 425 to the first cache 415 or the second cache 420. In some examples, the non-volatile memory 410 may temporarily move the data to perform one or more maintenance operations on the main storage 425. For example, the non-volatile memory may perform refresh operations, garbage collection operations, diagnostic or other evaluations related to memory device performance or conditions on the main storage 425. Accordingly, data may be temporarily moved from the main storage 425 to the first cache 415 or the second cache 420 to perform the maintenance operations. Once the maintenance operations are complete, the non-volatile memory 410 may write the data back to the main storage 425 (e.g., write the data from the first cache 415 or the second cache 420 back to the main storage 425).

As described herein, the non-volatile memory 410 may include cache space (e.g., the first cache 415 and the second cache 420) and main storage 425 that each include memory cells configured to be operated as a respective one of SLCs, MLCs, TLCs, or QLCs. Moreover, data may be temporarily stored to the first cache 415 and second cache 420 (and moved between the caches and/or main storage 425) according to characteristics of data to be written, as well as desired performance characteristics of the non-volatile memory 410.

In some examples, operating memory cells of the first cache 415 or memory cells of the second cache 420 as TLCs (or MLCs) rather than SLCs may improve some performance aspects of the system 400 (e.g., endurance). For example, it may be possible to operate the memory cells of the first cache 415 or the memory cells of the second cache 420 as QLCs, but the memory cells may instead be operated as TLCs based on one or more desired performance conditions. Accordingly, if the storage capacity of the first cache 415 or the second cache 420 to store data would be X if operated as QLCs, but the first cache 415 or the second cache 420 is instead operated as TLCs, then the actual data stored by the first cache 415 or the second cache 420 may be 0.75X (e.g., 3 bits per cell rather than 4 bits per cell, so ¾ of the QLC-supported capacity). Similarly, if the memory cells of the first cache 415 or the memory cells of the second cache 420 are operated as MLCs, the actual data stored by the first cache 415 or the second cache 420 may be 0.5X (e.g., 2 bits per cell rather than 4 bits per cell, so ½ of the QLC-supported capacity). And similarly, if the memory cells of the first cache 415 or the memory cells of the second cache 420 are operated as SLCs, the actual data stored by the first cache 415 or the second cache 420 may be 0.25X (e.g., 1 bit per cell rather than 4 bits per cell, so ¼ of the QLC-supported capacity).

Program and erase cycles performed on memory cells of the first cache 415 or second cache 420 may wear out the memory cells over time, and such considerations may be wholly or largely independent of whether the memory cells are operated as SLCs, MLCs, or TLCs. Thus, more data (e.g., two or three times more data) may be written to the memory cells of the first cache 415 or the second cache 420 before reaching an endurance limit of the memory cells if the memory cells are operated as MLCs or TLCs rather than SLCs. Thus, in some cases, the write amplification associated with operating the memory cells included in the first cache 415 or second cache 420 as MLCs or TLCs may be characterized as lower relative to the write amplification associated with operating those same memory cells as SLCs, and thus operating the memory cells included in the first cache 415 or second cache 420 as MLCs or TLCs may have endurance benefits.

Additionally or alternatively, using the multi-tier cache structure as described herein, different performance gears may be available to the host system 405. For example, if the host system 405 requires relatively faster burst performance (e.g., by direct host protocol or by a non-volatile memory initiated algorithm), the memory cells of the first cache 415 or the second cache 420 may be operated as SLCs due to SLCs being associated with relatively faster speeds. Additionally or alternatively, if the host system 405 requires relatively slower burst performance, the memory cells of the first cache 415 or the second cache 420 may be operated as TLCs. Moreover, if the host system 405 does not require any performance threshold to be met, data can be routed directly to the main storage 425 (e.g., QLCs). Accordingly, the configuration of the system 400 may optimize the storage capacity and speed of the non-volatile memory 410.

In some examples, the host system 405 may determine whether to operate the first cache 415 or the second cache 420 according to a first latency (e.g., a relatively lower read or write latency) or a second latency (e.g., a relatively higher read or write latency). The host system 405 may operate the memory cells of the first cache 415, the second cache 420, or both as SLCs in response to determining that the first cache 415, the second cache 420, or both is to be operated according to the first latency. The host system 405 may operate the memory cells of the first cache 415, the second cache 420, or both as MLCs or TLCs in response to determining that the first cache 415, the second cache 420, or both is to be operated according to the second latency.

In other examples, the host system 405 may desire a lower rate of wearout (e.g., a longer endurance) with an intermediate level of latency. In such examples, the memory cells of at least one of the first cache 415 or the second cache 420 may be operated as MLCs or TLCs. For example, as explained above, because TLCs and MLCs may be configured to store multiple bits of data, TLCs and QLCs may require fewer access operations (e.g., compared to SLCs) in order to store a quantity of bits of data. In other cases, the host system 405 may desire a lower rate of wearout (e.g., a shorter endurance) without regard to latency considerations. In such examples, the first cache 415 or the second cache 420 may be bypassed, and data may be routed directly to the main storage 425 (e.g., QLCs). Accordingly, the system 400 may be configured and in some cases configurable to optimize the storage capacity and speed of the non-volatile memory 410. Thus, the host system 405 may determine whether to operate the first cache 415 or the second cache 420 according to a first endurance (e.g., higher rate of wearout) or a second endurance (e.g., lower rate of wearout) based on one or more desired performance characteristics. The host system 405 may operate the memory cells of the first cache 415, the second cache 420, or both as SLCs in response to determining that the first cache 415, the second cache 420, or both is to be operated according to the first endurance. The host system 405 may operate the memory cells of the first cache 415, the second cache 420, or both as MLCs or TLCs in response to determining that the first cache 415, the second cache 420, or both is to be operated according to the second endurance.

Figure 5:
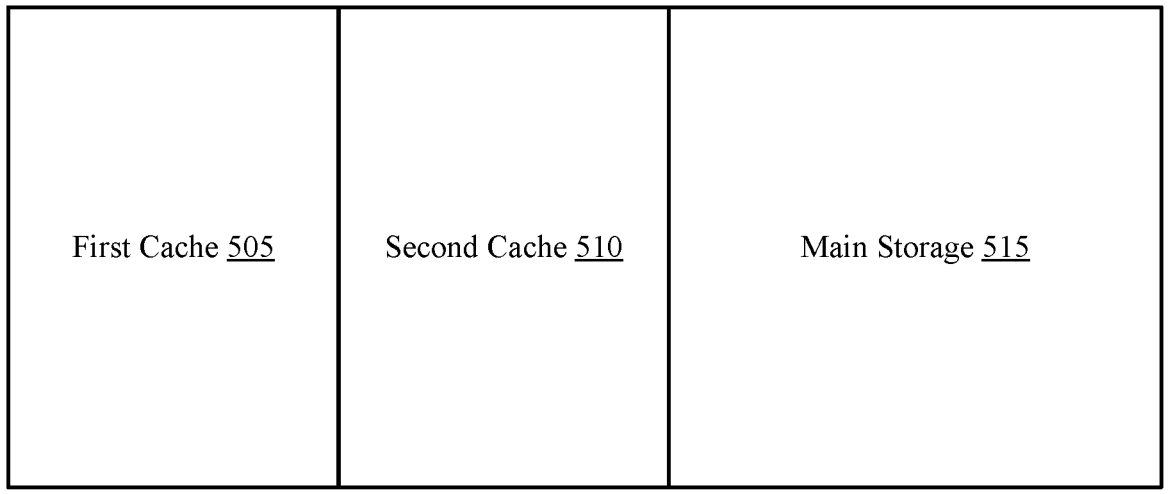
FIG. 5 illustrates an example of a block diagram that supports a multi-tier cache for a memory system in accordance with examples as disclosed herein.

FIG. 5 illustrates an example of a block diagram 500 of a non-volatile memory that supports a multi-tier cache for a memory system in accordance with examples as disclosed herein. The non-volatile memory may include a first cache 505, a second cache 510, and a main storage 515. In some examples, the first cache 505, the second cache 510, and the main storage 515 may be examples of the first cache 415, the second cache 420, and the main storage 425, respectively, as described with reference to FIG. 4. In some examples, the non-volatile memory may include a local controller (not shown), a memory system controller (not shown), or both, which may cause the non-volatile memory to perform one or more of the operations described herein.

The first cache 505, the second cache 510, and the main storage 515 may include one or more memory cells (e.g., NAND memory cells) that are configured to store one or more bits of data. For example, the first cache 505, the second cache 510, and the main storage 515 may each include a respective one of SLCs configured to store one bit of data, MLCs configured to store two bits of data, TLCs configured to store three bits of data, or QLCs configured to store four bits of data. Each of the first cache 505, the second cache 510, and the main storage 515 may include memory cells configured as a different respective type of memory cells, which may optimize the storage capacity and speed of the associated non-volatile memory.

In some examples, the size of the first cache 505, the second cache 510, and the main storage 515 may be configurable (e.g., dynamic) such that the quantity of memory cells associated with each may increase or decrease, or may be static (e.g., fixed). For example, the size of the first cache 505 may increase relative to the size of the second cache 510 and the main storage 515 based on a quantity of available cells in the first cache 505 (or the second cache 510). The size of the first cache 505 and the second cache 510 may be configurable or static according to the configuration shown below in Table 2, although other configurations are possible.

TABLE 2

| First Cache 505 | Second Cache 510 |
|---|---|
| Fixed | Fixed |
| Fixed | Variable |
| Variable | Fixed |
| Variable | Variable |

In addition to the first cache 505 and the second cache 510 including a fixed or variable quantity of memory cells, the main storage 515 may also include a fixed or variable quantity of memory cells. Being able to configure the types and quantities of memory cells located in the first cache 505, the second cache 510, and main storage 515 may optimize the storage capacity and speed of the associated non-volatile memory.

In some examples, the size of the first cache 505, the second cache 510, or the main storage 530 may be adjusted based on a quantity of available memory cells within one or more of the first cache 505, the second cache 510, or the main storage 530. For example, the associated non-volatile memory may include a local controller or a memory system controller configured to write data to the first cache 505 or the second cache 510 based on receiving a command (e.g., a write command) from a host system. As data is written to the first cache 505 or the second cache 510, the respective cache may become saturated (e.g., full). In some examples, the respective cache may become physically saturated. The physically saturated memory cells may be erased to make room for new data to be written to the respective cache. However, in other examples, the respective cache may become logically saturated such that it may be desirable to increase the size of the cache. A cache may become logically saturated as it is filled with valid data. For example, if a cache is completely full of valid data, the cache may be completely logically saturated (e.g., fully logically saturated). Additionally or alternatively, a cache may become physically saturated as some of its data becomes invalid. Invalid blocks of data may be removed, for example, during a garbage collection operation, which may reduce the physical saturation of the cache. Accordingly, if memory cells become logically saturated, the data may be unable to be erased, thus as data is written to the respective cache, the quantity of available memory cells of the cache may be reduced.

If a quantity of available memory cells of a cache becomes critically low due to logical saturation (e.g., if the quantity falls below a threshold value), the size of the cache may be adjusted. For example, the first cache 505 may be dynamic in size and may become relatively saturated due to data being written to it. The non-volatile memory (e.g., a local controller or a memory system controller of the non-volatile memory) may determine that the quantity of available memory cells has fallen below a threshold value. The non-volatile memory may determine the quantity of available memory cells upon receiving a command (e.g., a write command), or may make the determination periodically. The threshold value may be a static value set based on various design considerations, or may be determined in real time based on the length (e.g., the size) of a write command received from a host system. In either instance, the non-volatile memory may determine to increase the size of the first cache 505 (e.g., the non-volatile memory may determine to increase the quantity of memory cells being operated as a type of memory cell included in the first cache 505). In other examples, the non-volatile memory may determine to increase the size of the second cache 510 based on the same or similar considerations.

The non-volatile memory may adjust the size of the first cache 505, the second cache 510, or the main storage 515 by operating memory cells of a different cache (or of the main storage 515) as a different type of memory cell. For example, the first cache 505 may include memory cells being operated as SLCs and may be variable (e.g., dynamic) in size. Additionally, the main storage 515 may include memory cells being operated as QLCs and may be variable (e.g., dynamic) in size. To increase the size of the first cache 505, the non-volatile memory may operate QLCs of the main storage 515 as SLCs, such that the SLCs may be included in the first cache 505. Accordingly, the size of the first cache 505 may increase and the size of the main storage 515 may decrease, which may optimize the storage capacity and speed of the associated non-volatile memory.

In other examples, the non-volatile memory may adjust the size of the first cache 505 by operating memory cells of the second cache 510 in a different manner, or may adjust the size of the second cache 510 by operating memory cells of the first cache 505 or the main storage 515 in a different manner. As described herein, whether the size of the first cache 505, the second cache 510, or the main storage 515 is fixed or variable may be a matter of design choice in order to optimize the storage capacity and speed of the associated non-volatile memory. Additionally or alternatively, the first cache 505 and the second cache 510 may be configured to include a same or different quantity of memory cells, or may be configured to have a same or different storage density. Moreover, in some examples the size of the first cache 505 or the second cache 510 may be reduced such that the cache is effectively eliminated (e.g., such that the cache has no available memory cells), while in other examples the first cache 505 or the second cache 510 may be maintained at or above a minimum size such that the associated non-volatile memory always includes at least two caches.

Figure 6:
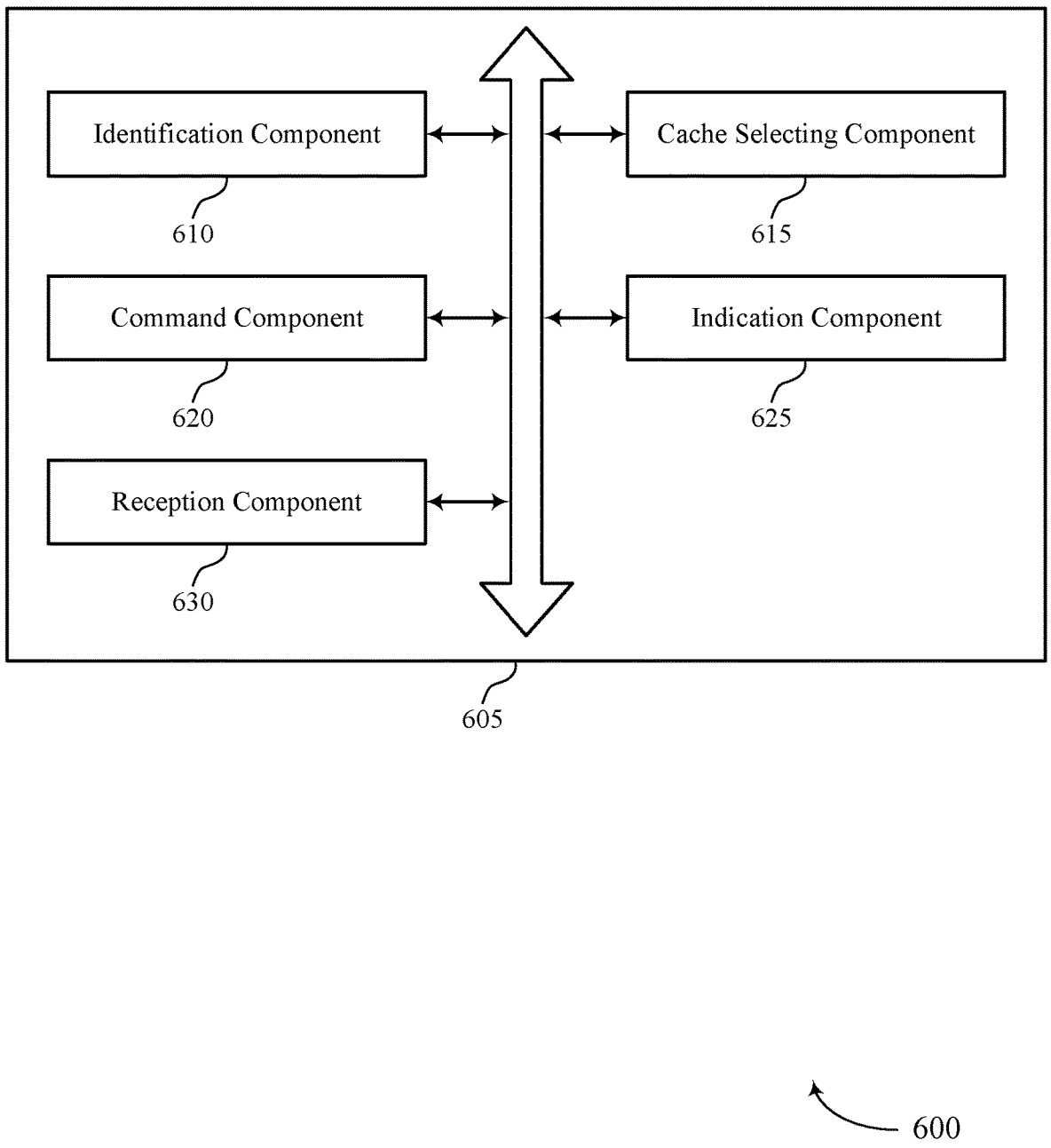
FIG. 6 shows a block diagram of a host system that supports a multi-tier cache for a memory system in accordance with aspects of the present disclosure.

FIG. 6 shows a block diagram 600 of a host system 605 that supports a multi-tier cache for a memory system in accordance with examples as disclosed herein. The host system 605 may be an example of aspects of a host system as described with reference to FIGS. 1 and 4. The host system 605 may include an identification component 610, a cache selecting component 615, a command component 620, an indication component 625, and a reception component 630. Each of these modules may communicate, directly or indirectly, with one another (e.g., via one or more buses).

The identification component 610 may identify data for writing to a non-volatile memory, where the non-volatile memory includes a first cache having a first set of memory cells operated as a first type of memory cell, a second cache having a second set of memory cells operated as a second type of memory cell, and a third set of memory cells operated as a third type of memory cell. The first cache and the second cache may be caches for the third set of memory cells.

The cache selecting component 615 may select, from among a set of caches of the non-volatile memory that includes the first cache and the second cache, a target cache for the data based on a characteristic of the data. In some examples, the cache selecting component 615 may select the first cache of the non-volatile memory as the target cache based on a quantity of available memory cells within the first cache satisfying a threshold.

In some examples, the cache selecting component 615 may select the second cache of the non-volatile memory as the target cache based on a quantity of available memory cells within the first cache being below a threshold. In some examples, the cache selecting component 615 may determine a desired performance characteristic of the non-volatile memory for writing the data, where the processor is configured to select the target cache based on the desired performance characteristic of the non-volatile memory. In some cases, the characteristic of the data includes a likelihood of the data being overwritten within a duration, a likelihood of a read command for the data being issued within a duration, a size of the data, or any combination thereof.

The command component 620 may issue, to the non-volatile memory, a command to write the data to the target cache.

The indication component 625 may issue, to the non-volatile memory, an indication of whether the target cache includes the first cache or the second cache.

The reception component 630 may receive, from the non-volatile memory, an indication of a quantity of available memory cells within the first cache, an indication of a quantity of available memory cells within the second cache, or both.

Figure 7:
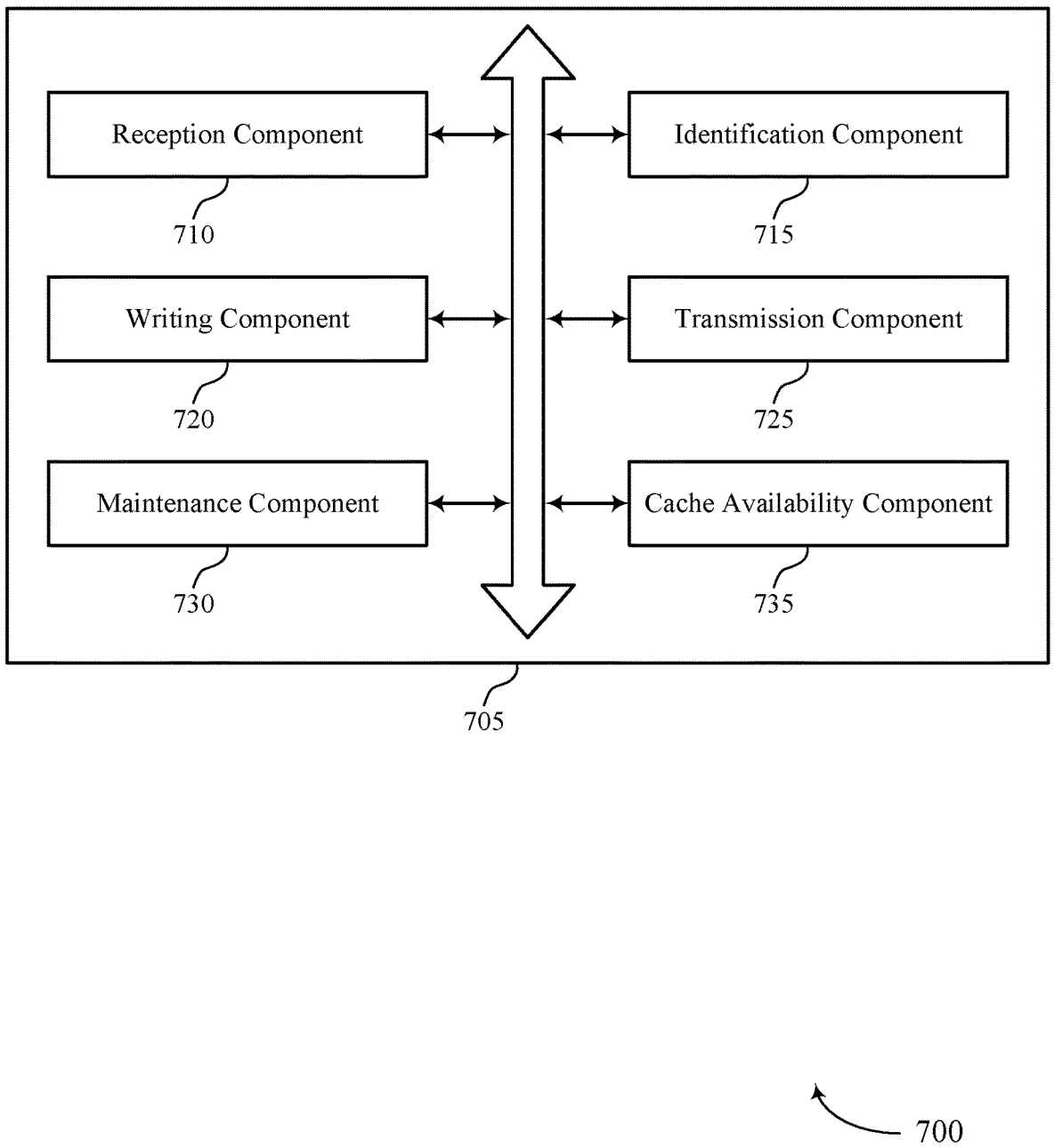
FIG. 7 shows a block diagram of a memory device that supports a multi-tier cache for a memory system in accordance with aspects of the present disclosure.

FIG. 7 shows a block diagram 700 of a memory device 705 that supports a multi-tier cache for a memory system in accordance with examples as disclosed herein. The memory device 705 may be an example of aspects of a memory device as described with reference to FIGS. 1 through 5. The memory device 705 may include a reception component 710, an identification component 715, a writing component 720, a transmission component 725, a maintenance component 730, and a cache availability component 735. Each of these modules may communicate, directly or indirectly, with one another (e.g., via one or more buses).

The reception component 710 may receive a command to write data to a non-volatile memory, where the non-volatile memory includes a first cache having a first set of memory cells operated as a first type of memory cell, a second cache having a second set of memory cells operated as a second type of memory cell, and a third set of memory cells operated as a third type of memory cell. The first cache and the second cache may be caches for the third set of memory cells. In some examples, the reception component 710 may receive a second command to write second data to the non-volatile memory.

The identification component 715 may identify an indication associated with the command, where the indication indicates a target cache that includes the first cache or the second cache. In some examples, the identification component 715 may identify a second indication associated with the command, where the second indication indicates the first cache as a second target cache for the second data.

The writing component 720 may write the data to the target cache based on the indication associated with the command. In some examples, the writing component 720 may write the data to the second cache based on determining that the quantity of available memory cells within the first cache is below the threshold. In some examples, the writing component 720 may write the second data to the second cache based on determining that quantity of available memory cells within the first cache is below the threshold.

In some examples, the writing component 720 may write the second data to the first cache based on determining that the quantity of available memory cells within the first cache satisfies the threshold or the second threshold. In some examples, the writing component 720 may write third data from the third set of memory cells to the first cache based on the one or more maintenance operations for the third set of memory cells. In some examples, the writing component 720 may write the third data to the third set of memory cells based on upon completing the one or more maintenance operations for the third set of memory cells.

The transmission component 725 may transmit an indication of the quantity of available memory cells within the first cache, the quantity of available memory cells within the second cache, or both.

The maintenance component 730 may initiate one or more maintenance operations for the third set of memory cells.

The cache availability component 735 may determine a quantity of available memory cells within the first cache, a quantity of available memory cells within the second cache, or both. In some examples, the cache availability component 735 may increase a quantity of memory cells included in the first cache by operating at least one memory cell of the second set of memory cells or the third set of memory cells as the first type of memory cell based on the quantity of available memory cells within the first cache.

In some examples, the target cache includes the first cache and the cache availability component 735 may determine, after writing the data to the first cache, whether a quantity of available memory cells within the first cache is below a threshold. In some examples, the cache availability component 735 may determine whether a quantity of available memory cells within the first cache is below a threshold based on identifying the first cache as the second target cache. In some examples, the cache availability component 735 may determine, after writing the second data to the second cache, that the quantity of available memory cells within the first cache satisfies the threshold or a second threshold.

In some cases, the second cache includes a different quantity of memory cells than the first cache. In some cases, the second cache has a greater storage density than the first cache. In some cases, the first cache or the second cache includes a fixed quantity of memory cells. In some cases, the first set of memory cells, the second set of memory cells, and the third set of memory cell each include not-and (NAND) memory cells. In some cases, the first type of memory cell, the second type of memory cell, and the third type of memory cell each include a respective one of a single-level cell (SLC), a multi-level cell (MLC), a triple-level cell (TLC), or a quad-level cell (QLC).

Figure 8:
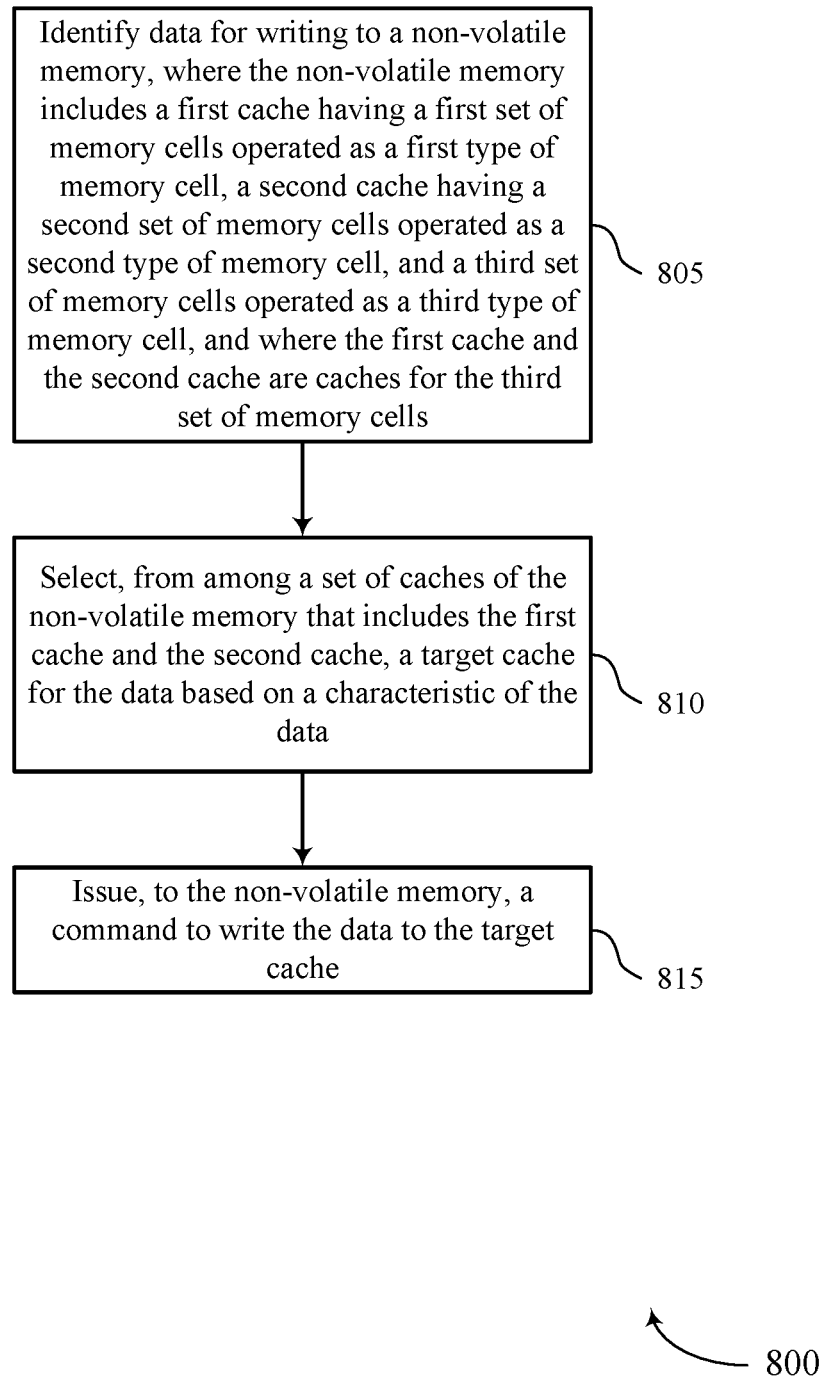
FIGS. 8 and 9 show flowcharts illustrating a method or methods that support a multi-tier cache for a memory system in accordance with examples as disclosed herein.

FIG. 8 shows a flowchart illustrating a method or methods 800 that supports a multi-tier cache for a memory system in accordance with aspects of the present disclosure. The operations of method 800 may be implemented by a host system or its components as described herein. For example, the operations of method 800 may be performed by a host system as described with reference to FIG. 6. In some examples, a host system may execute a set of instructions to control the functional elements of the host system to perform the described functions. Additionally or alternatively, a host system may perform aspects of the described functions using special-purpose hardware.

At 805, data for writing to a non-volatile memory may be identified by a host system. In some examples, the non-volatile memory may include a first cache having a first set of memory cells operated as a first type of memory cell, a second cache having a second set of memory cells operated as a second type of memory cell, and a third set of memory cells operated as a third type of memory cell. The first cache and the second cache may be caches for the third set of memory cells. The operations of 805 may be performed according to the methods described herein. In some examples, aspects of the operations of 805 may be performed by an identification component as described with reference to FIG. 6.

At 810, a target cache may be selected, from among a set of caches of the non-volatile memory that includes the first cache and the second cache, for the data by the host system based on a characteristic of the data. The operations of 810 may be performed according to the methods described herein. In some examples, aspects of the operations of 810 may be performed by a cache selecting component as described with reference to FIG. 6.

At 815, a command may be issued, to the non-volatile memory by the host system, to write the data to the target cache. The operations of 815 may be performed according to the methods described herein. In some examples, aspects of the operations of 815 may be performed by a command component as described with reference to FIG. 6.

In some examples, an apparatus and system as described herein may perform a method or methods, such as the method 800. The apparatus and system may include features, means, or instructions (e.g., a non-transitory computer-readable medium storing instructions executable by a processor) for identifying data for writing to a non-volatile memory, where the non-volatile memory includes a first cache having a first set of memory cells operated as a first type of memory cell, a second cache having a second set of memory cells operated as a second type of memory cell, and a third set of memory cells operated as a third type of memory cell. The first cache and the second cache may be caches for the third set of memory cells. The apparatus and system may include features, means, or instructions for selecting, from among a set of caches of the non-volatile memory that includes the first cache and the second cache, a target cache for the data based on a characteristic of the data, and issuing, to the non-volatile memory, a command to write the data to the target cache.

Some examples of the method 800, the apparatus, and the system described herein may further include operations, features, means, or instructions for issuing, to the non-volatile memory, an indication of whether the target cache includes the first cache or the second cache.

Some examples of the method 800, the apparatus, and the system described herein may further include operations, features, means, or instructions for selecting the first cache of the non-volatile memory as the target cache based on a quantity of available memory cells within the first cache satisfying a threshold.

Some examples of the method 800, the apparatus, and the system described herein may further include operations, features, means, or instructions for selecting the second cache of the non-volatile memory as the target cache based on a quantity of available memory cells within the first cache being below a threshold.

Some examples of the method 800, the apparatus, and the system described herein may further include operations, features, means, or instructions for receiving, from the non-volatile memory, an indication of a quantity of available memory cells within the first cache, an indication of a quantity of available memory cells within the second cache, or both.

In some examples of the method 800, the apparatus, and the system described herein, the characteristic of the data includes a likelihood of the data being overwritten within a duration, a likelihood of a read command for the data being issued within a duration, a size of the data, or any combination thereof.

Some examples of the method 800, the apparatus, and the system described herein may further include operations, features, means, or instructions for determining a desired performance characteristic of the non-volatile memory for writing the data, where the processor may be configured to select the target cache based on the desired performance characteristic of the non-volatile memory.

Figure 9:
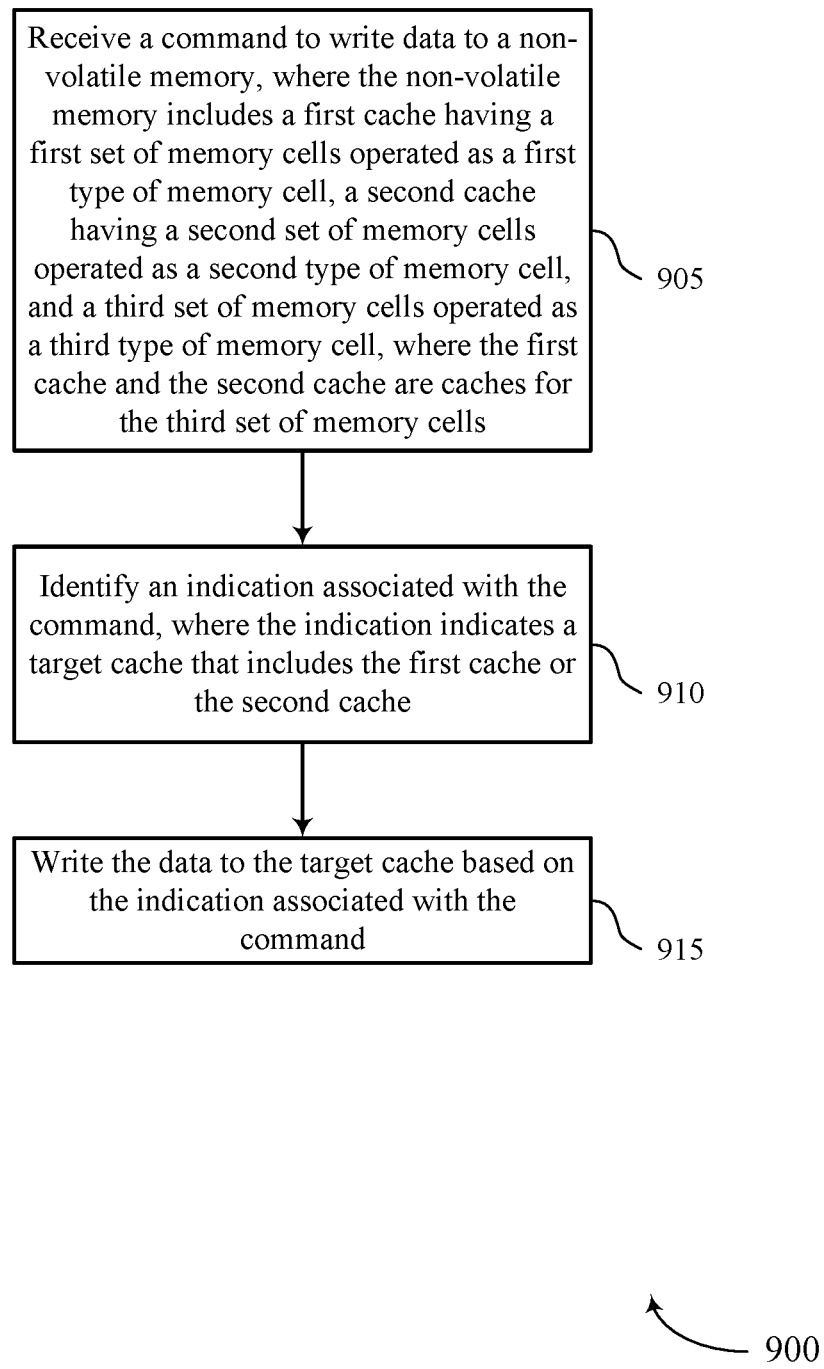

FIG. 9 shows a flowchart illustrating a method or methods 900 that supports a multi-tier cache for a memory system in accordance with aspects of the present disclosure. The operations of method 900 may be implemented by a memory device or its components as described herein. For example, the operations of method 900 may be performed by a memory device as described with reference to FIG. 7. In some examples, a memory device may execute a set of instructions to control the functional elements of the memory device to perform the described functions. Additionally or alternatively, a memory device may perform aspects of the described functions using special-purpose hardware.

At 905, a command to write data to a non-volatile memory may be received by the memory device. In some examples, the non-volatile memory may include a first cache having a first set of memory cells operated as a first type of memory cell, a second cache having a second set of memory cells operated as a second type of memory cell, and a third set of memory cells operated as a third type of memory cell. The first cache and the second cache may be caches for the third set of memory cells. The operations of 905 may be performed according to the methods described herein. In some examples, aspects of the operations of 905 may be performed by a reception component as described with reference to FIG. 7.

At 910, indication associated with the command may be identified by the memory device, where the indication indicates a target cache that includes the first cache or the second cache. The operations of 910 may be performed according to the methods described herein. In some examples, aspects of the operations of 910 may be performed by an identification component as described with reference to FIG. 7.

At 915, data may be written to the target cache by the memory device based on the indication associated with the command. The operations of 915 may be performed according to the methods described herein. In some examples, aspects of the operations of 915 may be performed by a writing component as described with reference to FIG. 7.

In some examples, an apparatus and system as described herein may perform a method or methods, such as the method 900. The apparatus and system may include features, means, or instructions (e.g., a non-transitory computer-readable medium storing instructions executable by a processor) for receiving a command to write data to a non-volatile memory, where the non-volatile memory includes a first cache having a first set of memory cells operated as a first type of memory cell, a second cache having a second set of memory cells operated as a second type of memory cell, and a third set of memory cells operated as a third type of memory cell. The first cache and the second cache may be caches for the third set of memory cells. The apparatus and the system described herein may further include operations, features, means, or instructions for identifying an indication associated with the command, where the indication indicates a target cache that includes the first cache or the second cache, and writing the data to the target cache based on the indication associated with the command.

Some examples of the method 900, the apparatus, and the system described herein may further include operations, features, means, or instructions for determining a quantity of available memory cells within the first cache, a quantity of available memory cells within the second cache, or both, and transmitting an indication of the quantity of available memory cells within the first cache, the quantity of available memory cells within the second cache, or both.

Some examples of the method 900, the apparatus, and the system described herein may further include operations, features, means, or instructions for adjusting a quantity of memory cells included in the first cache by operating at least one memory cell of the second set of memory cells or the third set of memory cells as the first type of memory cell based at least in part on the quantity of available memory cells within the first cache.

In some examples of the method 900, the apparatus, and the system described herein, the target cache may be the first cache, and the method 900, the apparatus, and the system described herein may include operations, features, means, or instructions for determining, after writing the data to the first cache, whether a quantity of available memory cells within the first cache may be below a threshold, and writing the data to the second cache based on determining that the quantity of available memory cells within the first cache may be below the threshold.

Some examples of the method 900, the apparatus, and the system described herein may further include operations, features, means, or instructions for receiving a second command to write second data to the non-volatile memory, identifying a second indication associated with the command, where the second indication indicates the first cache as a second target cache for the second data, determining whether a quantity of available memory cells within the first cache may be below a threshold based on identifying the first cache as the second target cache, and writing the second data to the second cache based on determining that quantity of available memory cells within the first cache may be below the threshold.

Some examples of the method 900, the apparatus, and the system described herein may further include operations, features, means, or instructions for determining, after writing the second data to the second cache, that the quantity of available memory cells within the first cache satisfies the threshold or a second threshold, and writing the second data to the first cache based on determining that the quantity of available memory cells within the first cache satisfies the threshold or the second threshold.

Some examples of the method 900, the apparatus, and the system described herein may further include operations, features, means, or instructions for initiating one or more maintenance operations for the third set of memory cells, writing third data from the third set of memory cells to the first cache based on the one or more maintenance operations for the third set of memory cells, and writing the third data to the third set of memory cells based on upon completing the one or more maintenance operations for the third set of memory cells.

In some examples of the method 900, the apparatus, and the system described herein, the second cache includes a different quantity of memory cells than the first cache.

In some examples of the method 900, the apparatus, and the system described herein, the second cache may have a greater storage density than the first cache.

In some examples of the method 900, the apparatus, and the system described herein, the first cache or the second cache includes a fixed quantity of memory cells.

In some examples of the method 900, the apparatus, and the system described herein, the first set of memory cells, the second set of memory cells, and the third set of memory cell each include not-and (NAND) memory cells.

In some examples of the method 900, the apparatus, and the system described herein, the first type of memory cell, the second type of memory cell, and the third type of memory cell each include a respective one of a single-level cell (SLC), a multi-level cell (MLC), a triple-level cell (TLC), or a quad-level cell (QLC).

It should be noted that the methods described above describe possible implementations, and that the operations and the steps may be rearranged or otherwise modified and that other implementations are possible. Further, portions from two or more of the methods may be combined.

A system is described. The system may include a non-volatile memory including a first cache having a first set of memory cells operated as a first type of memory cell, a second cache having a second set of memory cells operated as a second type of memory cell, and a third set of memory cells operated as a third type of memory cell. The first cache and the second cache may be caches for the third set of memory cells. The system may further include a host system coupled with the non-volatile memory, where the host system is configured to identify data for writing to the non-volatile memory, select, from among a set of caches of the non-volatile memory that includes the first cache and the second cache, a target cache for the data based on a characteristic of the data and, and issue, to the non-volatile memory, a command to write the data to the target cache.

In some examples, the non-volatile memory includes a controller configured to adjust a first quantity of memory cells included in the first cache, a second quantity of memory cells included in the second cache, a third quantity of memory cells operated as the third type of memory cell, or any combination thereof.

In some examples, the controller may be configured to decrease the third quantity of memory cells based on the first quantity of memory cells falling below a first threshold, the second quantity of memory cells falling below a second threshold, or both.

In some examples, the host system may be configured to select the target cache based on a likelihood of the data being overwritten within a duration, a likelihood of a read command for the data being issued within a duration, a size of the data, or any combination thereof.

In some examples, a quantity of memory cells included in the second cache may be variable.

In some examples, the third set of memory cells may have a greater storage density than both the first cache and the second cache, and where the second cache may have a greater storage density than the first cache.

In some examples, the host system may be configured to determine whether to operate the first set of memory cells of the first cache according to a first latency or a second latency based at least in part on a desired performance characteristic, and determine to operate the first set of memory cells of the first cache as the first type of memory cell based at least in part on determining to operate the first set of memory cells of the first cache according to the first latency.

In some examples, the host system may be configured to determine whether to operate the first set of memory cells of the first cache according to a first endurance or a second endurance based at least in part on a desired performance characteristic, and determine to operate the first set of memory cells of the first cache as the first type of memory cell based at least in part on determining to operate the first set of memory cells of the first cache according to the first endurance.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The term "layer" or "level" used herein refers to a stratum or sheet of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, and/or materials. In some examples, one layer or level may be composed of two or more sublayers or sublevels.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A memory system, comprising:
   a non-volatile memory; and
   one or more controllers coupled with the non-volatile memory and configured to cause the memory system to:
   receive a command to write data to the non-volatile memory, wherein the non-volatile memory comprises a first cache having a first set of memory cells operated as a first type of memory cell, a second cache having a second set of memory cells operated as a second type of memory cell different than the first type of memory cell, and a third set of memory cells operated as a third type of memory cell different than the first type of memory cell and the second type of memory cell, wherein the first cache and the second cache are caches for the third set of memory cells;
   identify an indication associated with the command, wherein the indication indicates a target cache that comprises one of the first cache or the second cache, and wherein a cache different than the target cache comprises the other of the first cache or the second cache;
   determine, after receiving the command, a quantity of available memory cells within the target cache based at least in part on the indication of the target cache;
   write, in response to the command, the data included in the received command to the cache different than the target cache based at least in part on determining that the quantity of available memory cells within the target cache does not satisfy a cache-specific threshold value;
   determine, after a duration, that the quantity of available memory cells within the target cache satisfies the cache-specific threshold value;
   move, in response to the command, the data from the cache different than the target cache to the target cache based at least in part on the quantity of available memory cells within the target cache satisfying the cache-specific threshold value; and
   write, in response to a second command, second data to the cache different than the target cache based at least in part on determining that the quantity of available memory cells within the target cache does not satisfy the cache-specific threshold value.

2. The memory system of claim 1, wherein the one or more controllers is further configured to cause the memory system to:
   determine a quantity of available memory cells within the first cache, a quantity of available memory cells within the second cache, or both; and
   transmit an indication of the quantity of available memory cells within the first cache, the quantity of available memory cells within the second cache, or both.

3. The memory system of claim 2, wherein the one or more controllers is further configured to cause the memory system to:
   adjust a quantity of memory cells included in the first cache by operating at least one memory cell of the second set of memory cells or the third set of memory cells as the first type of memory cell based at least in part on the quantity of available memory cells within the first cache.

4. The memory system of claim 1, wherein the one or more controllers is further configured to cause the memory system to:

receive the second command to write the second data to the non-volatile memory;
identify a second indication associated with the second command, wherein the second indication indicates the first cache as the target cache for the second data; and
determine whether a quantity of available memory cells within the first cache is below the cache-specific threshold value based at least in part on identifying the first cache as the target cache, wherein the second data is written to the cache different than the target cache based at least in part on determining that quantity of available memory cells within the first cache is below the cache-specific threshold value.

5. The memory system of claim 1, wherein the one or more controllers is further configured to cause the memory system to:
initiate one or more maintenance operations for the third set of memory cells;
write third data from the third set of memory cells to the first cache or the second cache based at least in part on the one or more maintenance operations for the third set of memory cells; and
write the third data to the third set of memory cells based at least in part on completing the one or more maintenance operations for the third set of memory cells.

6. The memory system of claim 1, wherein the second cache comprises a different quantity of memory cells than the first cache.

7. The memory system of claim 1, wherein the second cache has a greater storage density than the first cache.

8. The memory system of claim 1, wherein the first cache or the second cache comprises a fixed quantity of memory cells.

9. The memory system of claim 1, wherein the first set of memory cells, the second set of memory cells, and the third set of memory cells each comprise not-and (NAND) memory cells.

10. The memory system of claim 1, wherein the first type of memory cell, the second type of memory cell, and the third type of memory cell each comprise a respective one of a single-level cell (SLC), a multi-level cell (MLC), a triple-level cell (TLC), or a quad-level cell (QLC).

11. A method by a memory system, comprising:
receiving a command to write data to a non-volatile memory, wherein the non-volatile memory comprises a first cache having a first set of memory cells operated as a first type of memory cell, a second cache having a second set of memory cells operated as a second type of memory cell different than the first type of memory cell, and a third set of memory cells operated as a third type of memory cell different than the first type of memory cell and the second type of memory cell, wherein the first cache and the second cache are caches for the third set of memory cells;
identifying an indication associated with the command, wherein the indication indicates a target cache that comprises one of the first cache or the second cache, and wherein a cache different than the target cache comprises the other of the first cache or the second cache;
determining, after receiving the command, a quantity of available memory cells within the target cache based at least in part on the indication of the target cache;
writing, in response to the command, the data included in the received command to the cache different than the target cache based at least in part on determining that the quantity of available memory cells within the target cache does not satisfy a cache-specific threshold value;
determining, after a duration, that the quantity of available memory cells within the target cache satisfies the cache-specific threshold value;
moving, in response to the command, the data from the cache different than the target cache to the target cache based at least in part on the quantity of available memory cells within the target cache satisfying the cache-specific threshold value; and
writing, in response to a second command, second data to the cache different than the target cache based at least in part on determining that the quantity of available memory cells within the target cache does not satisfy the cache-specific threshold value.

12. The method of claim 11, further comprising:
determining a quantity of available memory cells within the first cache, a quantity of available memory cells within the second cache, or both; and
transmitting an indication of the quantity of available memory cells within the first cache, the quantity of available memory cells within the second cache, or both.

13. The method of claim 12, further comprising:
adjusting a quantity of memory cells included in the first cache by operating at least one memory cell of the second set of memory cells or the third set of memory cells as the first type of memory cell based at least in part on the quantity of available memory cells within the first cache.

14. The method of claim 11, further comprising:
initiating one or more maintenance operations for the third set of memory cells;
writing third data from the third set of memory cells to the first cache or the second cache based at least in part on the one or more maintenance operations for the third set of memory cells; and
writing the third data to the third set of memory cells based at least in part on completing the one or more maintenance operations for the third set of memory cells.

15. The method of claim 11, wherein the second cache comprises a different quantity of memory cells than the first cache.

16. A non-transitory computer readable medium storing code, the code comprising instructions executable by one or more processors to:
receive a command to write data to a non-volatile memory, wherein the non-volatile memory comprises a first cache having a first set of memory cells operated as a first type of memory cell, a second cache having a second set of memory cells operated as a second type of memory cell different than the first type of memory cell, and a third set of memory cells operated as a third type of memory cell different than the first type of memory cell and the second type of memory cell, wherein the first cache and the second cache are caches for the third set of memory cells;
identify an indication associated with the command, wherein the indication indicates a target cache that comprises one of the first cache or the second cache, and wherein a cache different than the target cache comprises the other of the first cache or the second cache;
determine, after receiving the command, a quantity of available memory cells within the target cache based at least in part on the indication of the target cache;

write, in response to the command, the data included in the received command to the cache different than the target cache based at least in part on determining that the quantity of available memory cells within the target cache does not satisfy a cache-specific threshold value;

determine, after a duration, that the quantity of available memory cells within the target cache satisfies the cache-specific threshold value;

move, in response to the command, the data from the cache different than the target cache to the target cache based at least in part on the quantity of available memory cells within the target cache satisfying the cache-specific threshold value; and write, in response to a second command, second data to the cache different than the target cache based at least in part on determining that the quantity of available memory cells within the target cache does not satisfy the cache-specific threshold value.

17. The non-transitory computer readable medium of claim 16, wherein the instructions are further executable by the one or more processors to:

determining a quantity of available memory cells within the first cache, a quantity of available memory cells within the second cache, or both; and transmitting an indication of the quantity of available memory cells within the first cache, the quantity of available memory cells within the second cache, or both.

18. The non-transitory computer readable medium of claim 17, wherein the instructions are further executable by the one or more processors to:

adjusting a quantity of memory cells included in the first cache by operating at least one memory cell of the second set of memory cells or the third set of memory cells as the first type of memory cell based at least in part on the quantity of available memory cells within the first cache.

19. The non-transitory computer readable medium of claim 17, wherein the instructions are further executable by the one or more processors to:

initiate one or more maintenance operations for the third set of memory cells;

write third data from the third set of memory cells to the first cache or the second cache based at least in part on the one or more maintenance operations for the third set of memory cells; and write the third data to the third set of memory cells based at least in part on completing the one or more maintenance operations for the third set of memory cells.

20. The non-transitory computer readable medium of claim 17, wherein the second cache comprises a different quantity of memory cells than the first cache.

* * * * *